(12) United States Patent
Brace et al.

(10) Patent No.: US 12,164,096 B2
(45) Date of Patent: Dec. 10, 2024

(54) DETERMINING AN ERRONEOUS MOVEMENT OF A MICROSCOPE

(71) Applicant: VIAVI Solutions Inc., San Jose, CA (US)

(72) Inventors: Jay Brace, Seattle, WA (US); Gordon Mackay, Seattle, WA (US); Andre Lavrentyev, Bothell, WA (US)

(73) Assignee: VIAVI Solutions Inc., Chandler, AZ (US)

( * ) Notice: Subject to any disclaimer, the term of this patent is extended or adjusted under 35 U.S.C. 154(b) by 397 days.

(21) Appl. No.: 17/582,325

(22) Filed: Jan. 24, 2022

(65) Prior Publication Data

US 2022/0146808 A1    May 12, 2022

Related U.S. Application Data

(63) Continuation of application No. 16/100,022, filed on Aug. 9, 2018, now Pat. No. 11,231,571.

(51) Int. Cl.
| | |
|---|---|
| G02B 21/00 | (2006.01) |
| G02B 21/18 | (2006.01) |
| G02B 21/36 | (2006.01) |

(52) U.S. Cl.
CPC ....... *G02B 21/008* (2013.01); *G02B 21/0052* (2013.01); *G02B 21/18* (2013.01); *G02B 21/361* (2013.01); *G02B 21/367* (2013.01)

(58) Field of Classification Search
CPC .. G02B 21/008; G02B 21/0052; G02B 21/18; G02B 21/361; G02B 21/367

USPC ......................................................... 359/368
See application file for complete search history.

(56) References Cited

U.S. PATENT DOCUMENTS

| | | |
|---|---|---|
| 6,309,601 B1 | 10/2001 | Juncosa et al. |
| 10,571,676 B1 | 2/2020 | Brace |
| 11,119,304 B2 | 9/2021 | Brace et al. |
| 2004/0125366 A1 | 7/2004 | Kiani et al. |
| 2008/0308726 A1 | 12/2008 | Jahnke et al. |
| 2013/0229650 A1 | 9/2013 | Wilson et al. |
| 2014/0118500 A1 | 5/2014 | Liu et al. |
| 2014/0126778 A1 | 5/2014 | Yu |
| 2014/0268104 A1 | 9/2014 | Treado et al. |
| 2015/0146967 A1 | 5/2015 | Miyamoto et al. |
| 2016/0198951 A1 | 7/2016 | Fujino et al. |
| 2016/0377546 A1 | 12/2016 | Ragan et al. |
| 2018/0053295 A1 | 2/2018 | Ryu et al. |
| 2020/0049966 A1 | 2/2020 | Brace et al. |

*Primary Examiner* — Mohammed A Hasan
*Assistant Examiner* — Rahman Abdur
(74) *Attorney, Agent, or Firm* — Harrity & Harrity, LLP

(57) ABSTRACT

A device may capture, using a camera associated with a microscope, a first image of interstitial material associated with a first set of optical fibers in a field of view of the camera. The device may perform a comparison of the first image of interstitial material and a second image of interstitial material associated with a second set of optical fibers. The device may determine that the first set of optical fibers does not include an expected set of optical fibers based on a result of performing the comparison. The device may determine an amount by which to adjust the field of view of the camera based on the result of performing the comparison. The device may perform one or more actions.

20 Claims, 15 Drawing Sheets

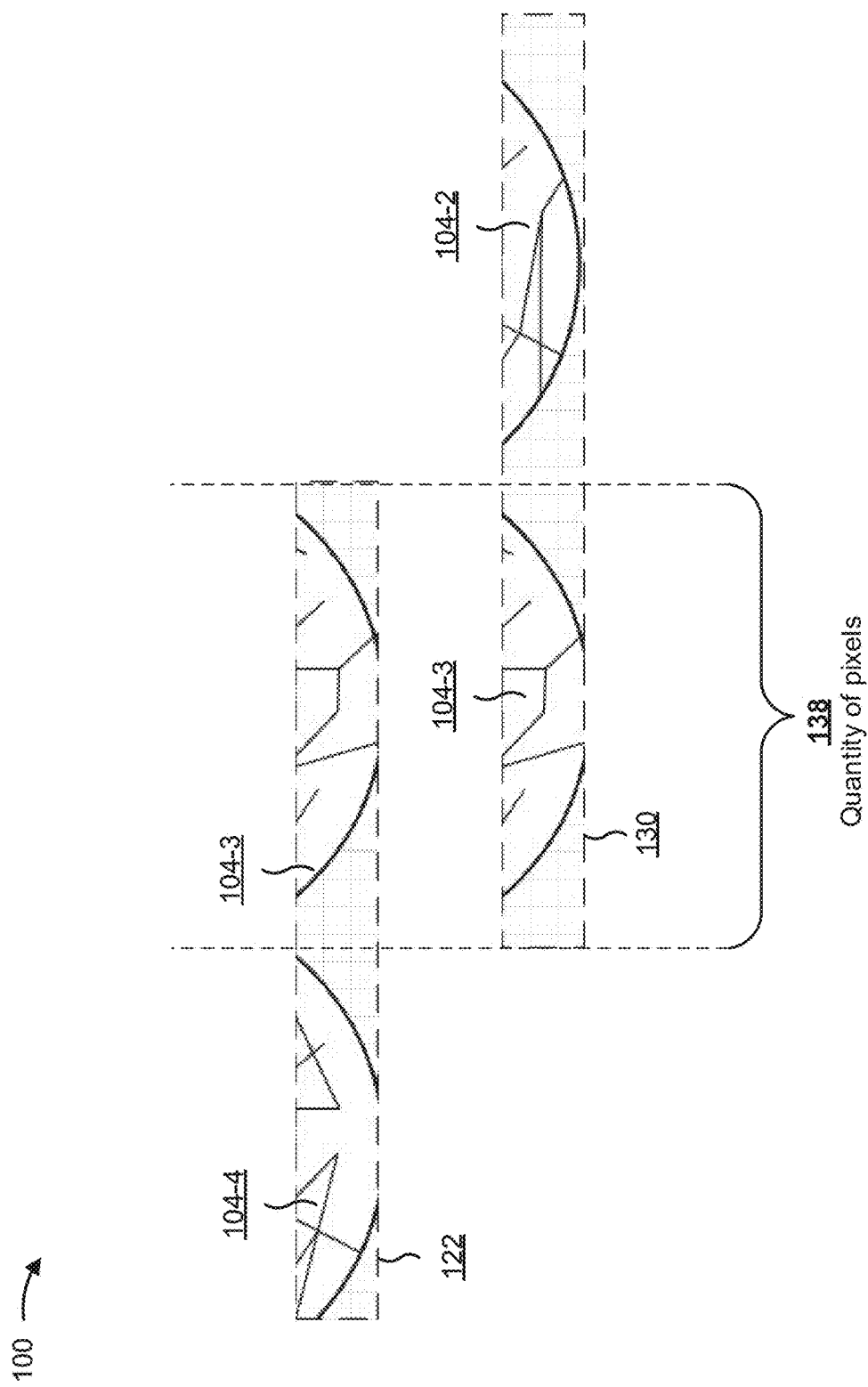

DETERMINING AN ERRONEOUS MOVEMENT OF A MICROSCOPE

RELATED APPLICATION

This application is a continuation of U.S. patent application Ser. No. 16/100,022, filed Aug. 9, 2018 (now U.S. Pat. No. 11,231,571), which is incorporated herein by reference in its entirety.

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like.

SUMMARY

According to some possible implementations, a method may include capturing, using a camera associated with a microscope, a first image of interstitial material associated with a first set of optical fibers in a field of view of the camera. The method may include performing, by the microscope, a comparison of the first image of interstitial material and a second image of interstitial material associated with a second set of optical fibers after capturing the first image of interstitial material. The method may include determining, by the microscope, that the first set of optical fibers does not include an expected set of optical fibers based on a result of performing the comparison. The method may include determining, by the microscope, an amount by which to adjust the field of view of the camera based on the result of performing the comparison. The method may include performing, by the microscope, one or more actions after determining the amount by which to adjust the field of view of the camera.

According to some possible implementations, a device may include, one or more memories; and one or more processors, communicatively coupled to the one or more memories, configured to capture, using a camera associated with the device, a first image of interstitial material associated with a first set of optical fibers within a field of view of the camera. The one or more processors may be configured to perform a comparison of the first image of interstitial material and a second image of interstitial material associated with a second set of optical fibers to determine whether there is a match between the first image of interstitial material and the second image of interstitial material. The one or more processors may be configured to determine that the first set of optical fibers does not include an expected set of optical fibers based on a result of performing the comparison. The one or more processors may be configured to determine to adjust the field of view of the camera based on determining that the first set of optical fibers does not include the expected set of optical fibers. The one or more processors may be configured to perform one or more actions after determining that the field of view of the camera is to be adjusted.

According to some possible implementations, a non-transitory computer-readable medium may store one or more instructions that, when executed by one or more processors, cause the one or more processors to capture, using a camera associated with a microscope, a first image of interstitial material associated with a first set of optical fibers within a field of view of the camera. The one or more instructions, when executed by the one or more processors, may cause the one or more processors to perform a comparison of the first image of interstitial material and a second image of interstitial material associated with a second set of optical fibers after capturing the first image.

The one or more instructions, when executed by the one or more processors, may cause the one or more processors to determine that there is an overlap in a portion of the first image and a portion of the second image based on a result of performing the comparison, wherein the overlap indicates an error in a relative movement of the camera and an optical connector, wherein the optical connector is associated with the first set of optical fibers and the second set of optical fibers. The one or more instructions, when executed by the one or more processors, may cause the one or more processors to determine that the first set of optical fibers does not include an expected set of optical fibers after determining that there is the overlap in the portion of the first image and the portion of the second image. The one or more instructions, when executed by the one or more processors, may cause the one or more processors to determine to adjust the field of view of the camera based on determining that the first set of optical fibers does not include the expected set of optical fibers. The one or more instructions, when executed by the one or more processors, may cause the one or more processors to perform one or more actions after determining that the field of view of the camera is to be adjusted.

BRIEF DESCRIPTION OF THE DRAWINGS

FIGS. 1A-1I are diagrams of an example implementation described herein.

DETAILED DESCRIPTION

The following detailed description of example implementations refers to the accompanying drawings. The same reference numbers in different drawings may identify the same or similar elements.

A technician may use a device, such as an optical fiber microscope, to examine optical fibers of an optical cable. For example, the device may capture images of the optical fibers and may analyze the optical fibers for defects, damage, and/or the like. The device may need to capture images of each optical fiber of the optical cable in order to perform an accurate analysis of the optical fibers. However, mechanical variability in functioning of the device (e.g., accuracy of mechanical movement, wear of mechanical parts, and/or the like) and/or technician error (e.g., movement by the technician) may cause the device to erroneously move a camera associated with the device and thereby cause the device to capture duplicate images of a same optical fiber, to fail to capture an image of an optical fiber, and/or the like.

Some implementations described herein provide a device that is capable of processing images captured of optical fibers to uniquely identify the optical fibers shown in the images, such as based on identifying a unique visual pattern of interstitial aterial associated with the optical fibers shown in the images. This facilitates processing images captured of optical fibers and determining whether the images show a same optical fiber more than a particular quantity of times, whether the images fail to show a particular optical fiber, and/or the like. In this way, the device may determine whether a same optical fiber was erroneously captured in multiple images, whether the device failed to capture an image of an optical fiber, and/or the like. This facilitates faster identification of errors in capturing images of optical fibers due to an error in movement of a camera of the device, thereby improving identification of errors. In addition, this reduces or eliminates a need for the technician to manually review images to determine whether an error in movement of the camera is present, thereby improving an efficiency of determining whether an error is present. Further, this conserves processing resources of the device via efficient identification and/or rectification of errors in movement of a camera of the device. In addition, this facilitates other types of actions, such as verifiability of maintenance and/or servicing of an optical cable and/or an optical fiber, provisioning of optical fiber-specific and/or optical cable-specific information for a technician during maintenance and/or servicing of an optical fiber and/or an optical cable, and/or the like, thereby improving maintenance and/or servicing of the optical fiber and/or the optical cable.

Figure 1A:
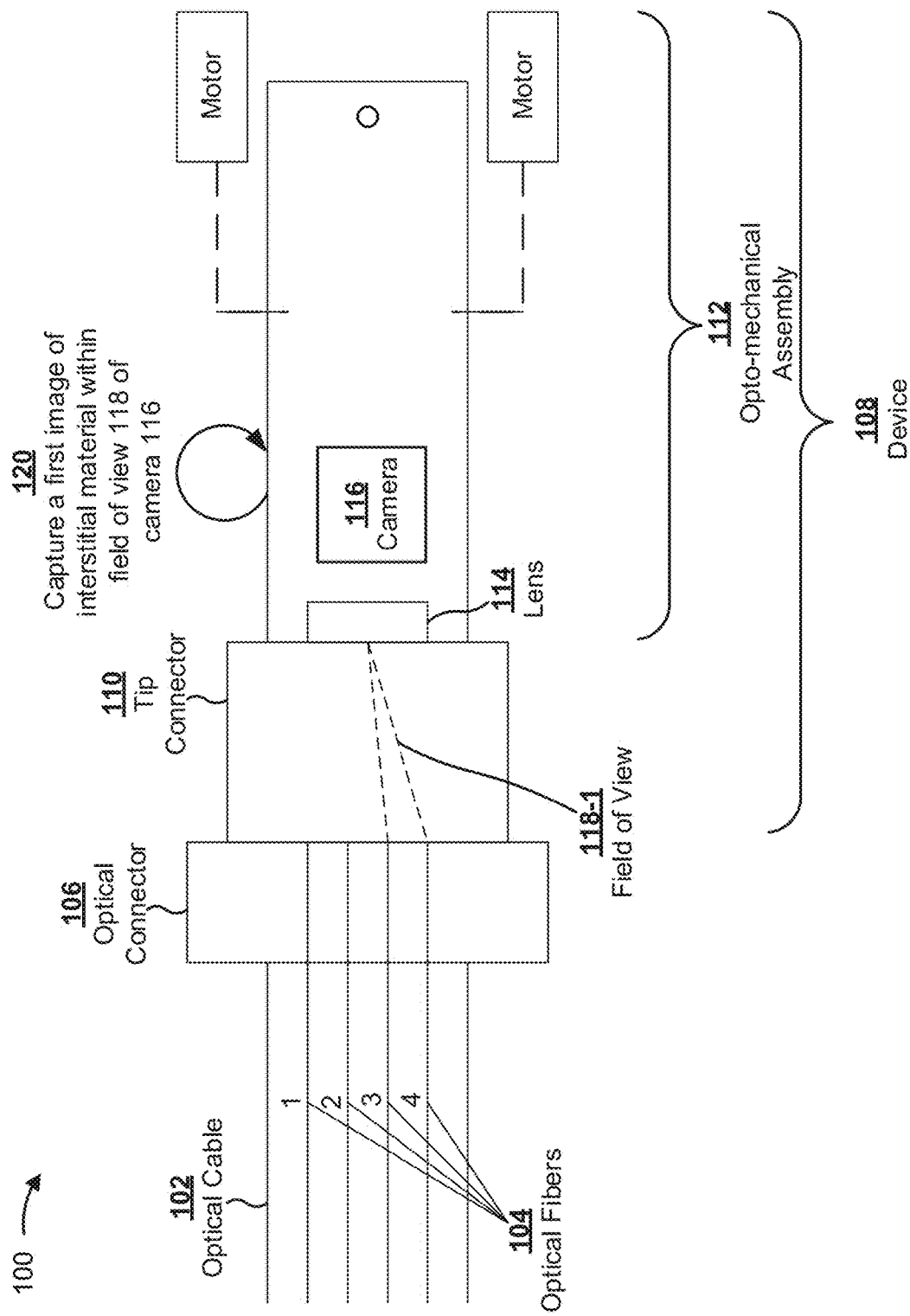

FIGS. 1A-1I are diagrams of an example implementation 100 described herein. As shown in FIG. 1A, implementation 100 may include an optical cable 102 that includes a set of optical fibers 104 (e.g., optical fibers 104-1 through 104-4), and an optical connector 106 that is attached to optical cable 102 (e.g., optical fibers 104 may be mounted in interstitial material within optical connector 106 connected to optical cable 102). Further, implementation 100 includes a device 108 (e.g., a handheld device 108) to be used to analyze optical fibers 104-1 through 104-4. Device 108 includes a tip connector 110 that permits device 108 to attach to optical cable 102 via optical connector 106. Further, device 108 includes an opto-mechanical assembly 112 to be used to move a microscope relative to optical fibers 104-1 through 104-4 to obtain (e.g., capture) a set of images and/or video of optical fibers 104-1 through 104-4 and/or to analyze optical fibers 104-1 through 104-4.

Opto-mechanical assembly 112 includes various components to be used to analyze optical fibers 104-1 through 104-4 (e.g., electronic components, optical components, mechanical components, and/or the like). For example, opto-mechanical assembly 112 may include a microscope that includes a lens 114 for viewing optical fibers 104-1 through 104-4. As further shown in FIG. 1A, the microscope of opto-mechanical assembly 112 may include a camera 116 to be used to capture a set of images and/or video of optical fibers 104-1 through 104-4. For example, camera 116 may capture a set of images and/or video that are to be analyzed by device 108 (or another device communicatively connected to device 108) to identify a defect, damage, and/or the like related to optical fibers 104-1 through 104-4. Continuing with the previous example, device 108 may provide the set of images and/or video to a server or a computing resource of a cloud computing environment) to permit the server or computing resource to perform an analysis of the set of images and/or video. In some implementations, device 108 may use camera 116 to capture an image and/or video of objects within field of view 118 of camera 116.

As shown by reference number 120, device 108 may capture a first image of interstitial material within a field of view of camera 116. For example, device 108 may capture a first image of interstitial material associated with a first set of optical fibers 104 within field of view 118-1 of camera 116 (e.g., interstitial material directly below the set first of optical fibers 104, on a particular side of optical fibers 104 included in the first set of optical fibers 104, within a threshold distance from optical fibers 104 included in the set of optical fibers 104, and/or the like).

In some implementations, device 108 may capture a single image of interstitial material associated with multiple optical fibers 104 when multiple optical fibers 104 are within field of view 118-1 of the camera 116. Conversely, device 108 may capture individual images of interstitial material for multiple optical fibers 104 when multiple optical fibers 104 are within field of view 118-1 of camera 116.

In some implementations, interstitial material may include material in optical cable 102 that surrounds optical fibers 104 of optical cable 102. For example, the interstitial material may include glass, plastic, and/or the like. In some implementations, the interstitial material may have a non-uniform visual pattern. For example, when the interstitial material includes crushed glass and/or crushed plastic, patterns created by variations in the crushed glass and/or the crushed plastic may cause the interstitial material to have a non-uniform visual pattern (e.g., a unique visual pattern). In some implementations, the non-uniform visual pattern may form a unique visual pattern that can be used to uniquely identify an optical fiber 104 and/or an optical cable 102. This unique identification of an optical fiber 104 and/or an optical cable 102 can facilitate performance of optical fiber 104-specific and/or optical cable 102-specific actions in a manner not previously possible, as described elsewhere herein.

In some implementations, device 108 may capture the first image after being connected to optical cable 102 via a mechanical connection between optical connector 106 and tip connector 110. Additionally, or alternatively, device 108 may capture the first image after a user of device 108 initiates operation of device 108 by selection of a physical button associated with device 108, by selection of a button associated with a user interface provided for display via a display associated with device 108, and/or the like (e.g., after initiating an analysis of optical fibers 104 of optical cable 102).

In some implementations, device 108 may capture the first image after automatically moving into the position shown in FIG. 1A. For example, device 108 may determine an edge of optical fibers 104 of optical cable 102 by moving camera 116 in a particular direction until device 108 moves camera 116 a threshold distance without another optical fiber 104 being brought within field of view 118-1 of camera 116 (e.g., using an image processing technique in a manner similar to that described below). In this way, device 108 may be positioned to capture an image of optical fibers 104 included in optical cable 102 in order (e.g., by moving camera 116 in a particular direction). In some implementations, optical cable 102 and/or optical connector 106 may be moved relative to device 108 such that optical fibers 104 are brought within field of view 118-1 (e.g., via a relative movement of optical cable 102 and/or optical connector 106 and camera 116). In some implementations, device 108 may include a set of components that is configured to move optical cable 102 and/or optical connector 106 in this manner.

In some implementations, device 108 may capture multiple images of field of view 118-1 and may select one of the captured images for later comparison. For example, device 108 may select an image where a set of optical fibers 104 within field of view 118-1 is centered within field of view 118-1, is entirely within field of view 118-1 of the camera 116, and/or the like. Additionally, or alternatively, and as another example, device 108 may select an image of the set of optical fibers 104 within field of view 118-1 that has a highest resolution or a highest quality relative to other captured images of the set of optical fibers 104 within field of view 118-1.

In some implementations, device 108 may capture the first image of the set of optical fibers 104 within field of view 118-1 after determining that the set of optical fibers 104 is substantially centered in field of view 118-1. For example, after moving camera 116 (and/or optical cable 102 and/or optical connector 106) into a position associated with field of view 118-1, device 108 may capture an initial image and may process the initial image to determine whether the set of optical fibers 104 is substantially centered within field of view 118-1. Continuing with the previous example, device 108 may process the initial image using a feature detection technique, a pattern matching technique, a shape detection technique, and/or the like to identify the set of optical fibers 104 in the initial image and/or to determine whether the set of optical fibers 104 is substantially centered in field of view 118-1. This improves a comparison of an image of the set of optical fibers 104 and another image of another set of optical fibers 104 by causing the image and the other image to be structured in a similar manner, described elsewhere herein.

In some implementations, device 108 may adjust field of view 118-1 based on determining that the set of optical fibers 104 is not substantially centered within field of view 118-1 (e.g., by moving camera 116, by moving optical cable 102 and/or optical connector 106, and/or the like). For example, device 108 may determine a quantity of pixels that the first set of optical fibers 104 is from being substantially centered (e.g., a quantity of pixels that a center of an optical fiber 104 is from a center of the initial image when a single optical fiber 104 or an odd quantity of optical fibers 104 is within field of view 118-1, a quantity of pixels that a point between two optical fibers 104 is from a center of the initial image when an even quantity of optical fibers 104 is within field of view 118-1, and/or the like).

In some implementations, and continuing with the previous example, a pixel may show an amount of distance of optical cable 102 e.g., a quantity of millimeters, a quantity of inches, and/or the like) based on a distance of camera 116 from optical cable 102, an amount of zoom implemented by camera 116, a resolution of camera 116, and/or the like. In some implementations, based on this, device 108 may determine an amount of distance camera 116 is to be adjusted such that the first set of optical fibers 104 is within field of view 118-1 and may adjust camera 116 by the amount so that the first set of optical fibers 104 is substantially centered within field of view 118-1. In some implementations, adjusting camera 116 may include moving camera 116 in a side-to-side direction, in an up-and-down direction, closer to the first set of optical fibers 104, further from the set first of optical fibers 104, and/or the like.

Figure 1B:
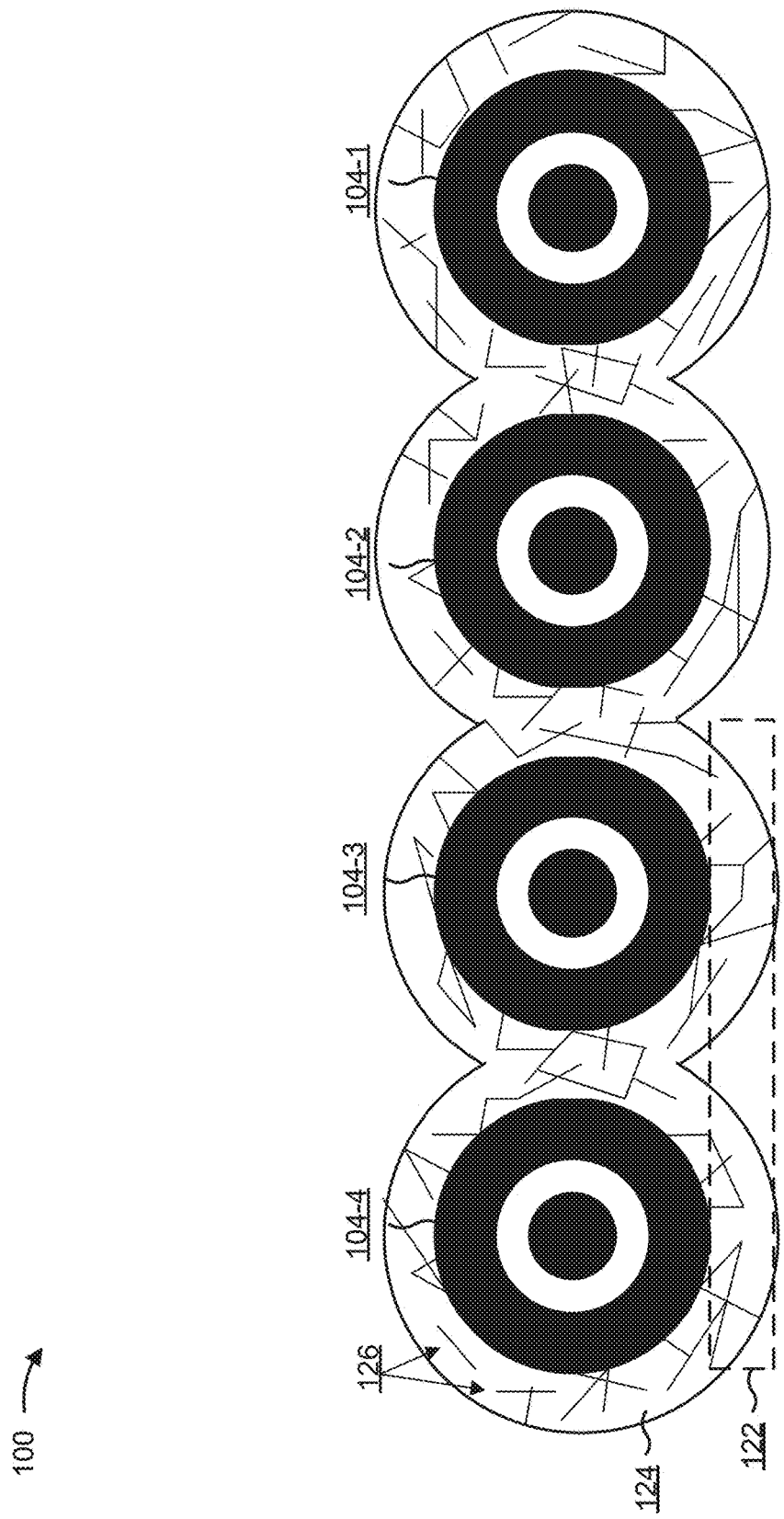

Turning to FIG. 1B, and as shown by reference number 122, device 108 may capture the first image of interstitial material 124 associated with the first set of optical fibers 104 in field of view 118-1 of camera 116. For example, assuming that optical fibers 104-3 and 104-4 are within field of view 118-1 of camera 116, then device 108 may capture the first image of interstitial material 124 associated with optical fibers 104-3 and 104-4. In some implementations, the first image may show a unique visual pattern of interstitial material 124. For example, and as shown by reference number 126, the image may show a unique visual pattern of crushed glass and/or crushed plastic included in interstitial material 124. In some implementations, and as further shown in FIG. 1B, device 108 may capture a single image of interstitial material 124 associated with optical fiber 104-3 and optical fiber 104-4. Conversely, in some implementations, device 108 may capture separate images of interstitial material 124 associated with optical fibers 104-3 and 104-4, despite both optical fibers 104-3 and 104-4 being within field of view 118-1.

Figure 1C:
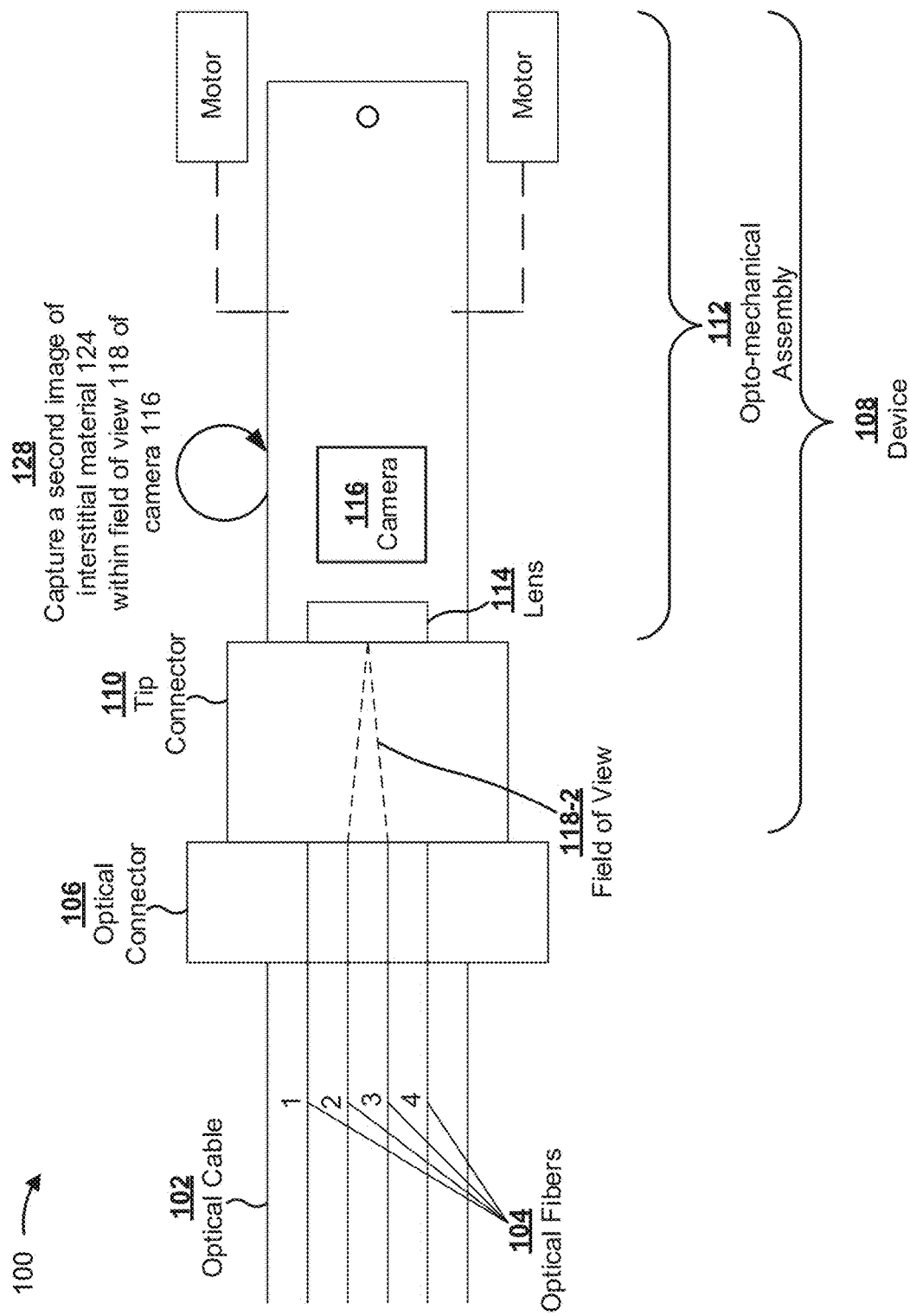

Turning to FIG. 1C, and as shown by reference number 128, device 108 may capture a second image of interstitial material 124 within field of view 118 of camera 116. For example, device 108 may capture a second image of interstitial material 124 within field of view 118-2 of camera 116, in a manner similar to that described elsewhere herein.

In some implementations, device 108 may capture the second image after moving camera 116 (and/or after moving optical cable 102 and/or optical connector 106) into a position associated with field of view 118-2. In some implementations, the position associated with field of view 118-2 may be an unexpected position. For example, device 108 may be configured such that device 108 is to move camera 116 a threshold distance such that a second set of optical fibers 104 is within field of view 118 of camera 116. For example, device 108 may be configured such that the amount of distance that device 108 moves camera 116 does not cause an overlap in optical fibers 104 within a field of view of camera 116. However, and as shown in FIG. 1C, the second set of optical fibers 104 within field of view 118-2 may include an overlap with the first set of optical fibers 104 within field of view 118-1 shown in FIG. 1A (e.g., optical fiber 104-3 may be within both field of view 118-1 and field of view 118-2). In other words, optical fibers 104-1 and 104-2 may be expected to be within field of view 118-2 (e.g., an expected set of optical fibers 104), but optical fibers 104-2 and 104-3 are actually within field of view 118-2 (e.g., an actual set of optical fibers 104), such as due to an error in a movement of camera 116 of device 108.

Figure 1D:
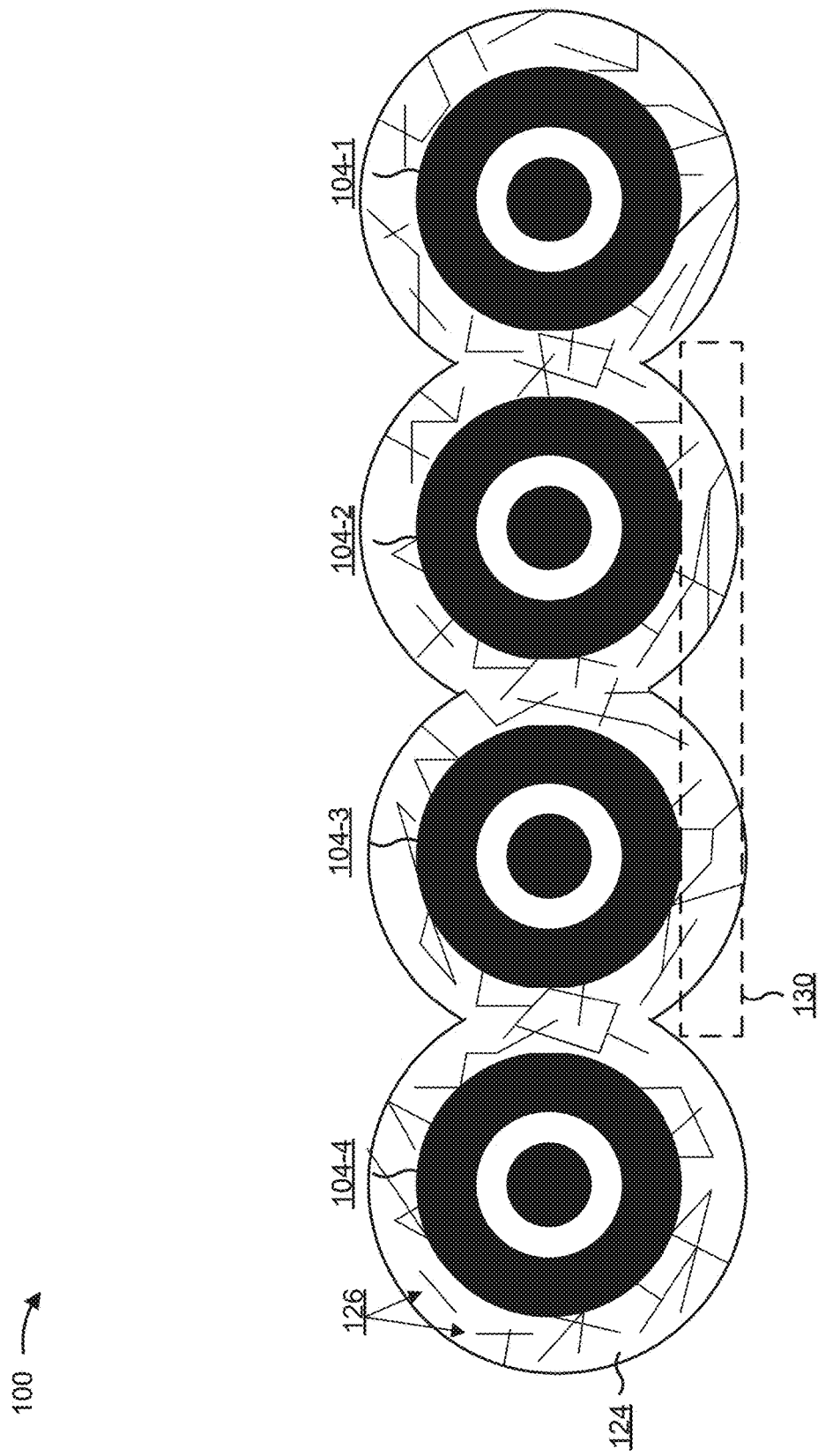

Turning to FIG. 1D, and as shown by reference number 130, the second image that device 108 captures may be an image of interstitial material 124 associated with optical fibers 104-2 and 104-3. For example, and similar to that described elsewhere herein, the second image may show a unique visual pattern of interstitial material 124 associated with optical fibers 104-2 and 104-3 (e.g., a unique pattern of crushed glass, crushed plastic, and/or the like) that can be used to uniquely identify optical cable 102 and/or optical fibers 104-1 through 104-4.

Figure 1E:
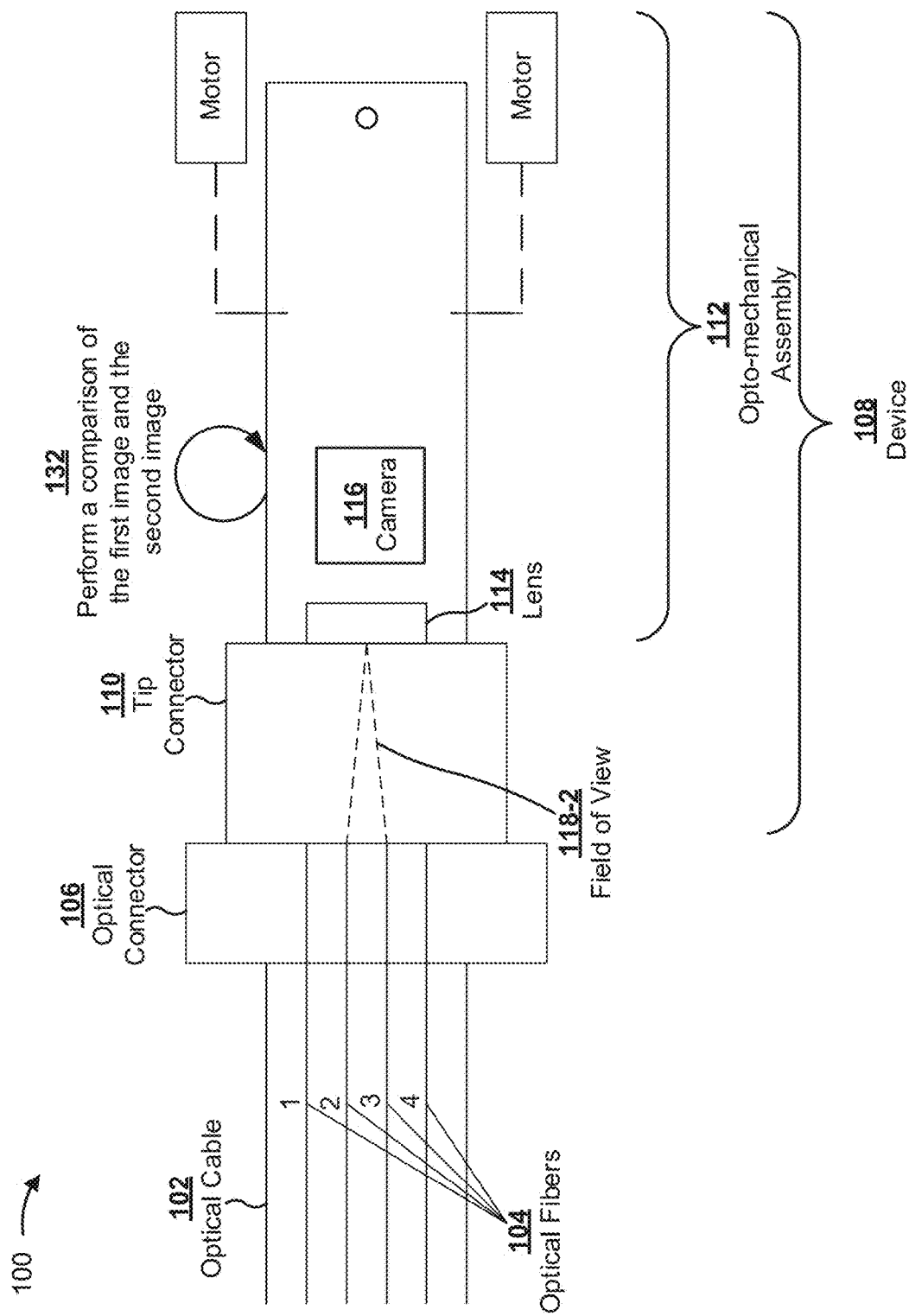

Turning to FIG. 1E, and as shown by reference number 132, device 108 may perform a comparison of the first image and the second image (e.g., of the first image shown by reference number 122 in FIG. 1B, and the second image shown by reference number 130 in FIG. 1D). For example, device 108 may perform a comparison of a unique visual pattern of interstitial material 124 shown in the first image and a second unique visual pattern of interstitial material 124 shown in the second image.

In some implementations, device 108 determine whether respective portions of the first image and the second image overlap. For example, device 108 may determine whether respective portions of interstitial material 124 shown in the first image and the second image match (e.g., match within a threshold level of similarity, exactly match, and/or the like). Additionally, or alternatively, and as another example, device 108 may determine whether respective pixels of the first image and the second image match. In some implementations, device 108 may determine whether respective portions of the first image and the second image overlap after aligning the first image and the second image (e.g., aligning the first image and the second image vertically with each other, overlaying the first image and the second image, and/or the like).

In some implementations, device 108 may determine an amount of overlap between the first image and the second image. For example, device 108 may determine a percentage of the first image and the second image that overlap, a quantity of pixels between the first image and the second image that overlap, and/or the like. In some implementations, device 108 may determine whether the amount of overlap satisfies a threshold. For example, depending on a configuration of device 108, there may be some overlap between two images when there is no error in the movement of camera 116.

In some implementations, device 108 may determine that an error has occurred with respect to moving camera 116 (and/or after moving optical cable 102 and/or optical connector 106) based on determining that the respective portions of the first image and the second image overlap. For example, device 108 may determine that an error has occurred with respect to moving camera 116 (e.g., that camera 116 has been moved less than an expected distance) when the image and the other image overlap, when an amount of overlap between the first image and the second image overlap satisfies a threshold, when a comparison of unique visual patterns of interstitial material 124 shown in the first image and the second image indicate that the same optical fiber 104 is shown in both the first image and the second image, and/or the like.

In some implementations, device 108 may determine whether the first image and the second image fail to overlap and/or fail to overlap by a threshold amount (e.g., indicating that camera 116 has been moved more than expected distance). For example, if device 108 is configured to capture images of consecutive sets of optical fibers 104 that are located next to each other in optical cable 102, then there may be some overlap between images that device 108 captures based on the sets of optical fibers 104 being located next to each other and/or depending on a size of field of view 118 of camera 116. In some implementations, device 108 may determine an error with respect to moving camera 116 if the first image and the second image fail to overlap, if the first image and the second image overlap by an amount that fails to satisfy a threshold, and/or the like.

In some implementations, device 108 may determine whether the second set of optical fibers 104 shown in the second image includes an expected set of optical fibers 104. For example, if device 108 is configured to move camera 116 by an expected amount, and if device 108 is configured with information that identifies a configuration of optical cable 102 (e.g., information that identifies a quantity of optical fibers 104 included in optical cable 102, that identifies a distance between optical fibers 104 of optical cable 102, and/or the like), device 108 may be capable of determining an expected set of optical fibers 104 that is to be shown in each image that device 108 captures.

In some implementations, by performing a comparison of unique visual patterns of interstitial material 124 shown in the first image and unique visual patterns of interstitial material 124 shown in the second image, device 108 may determine whether a same optical fiber 104 is shown in both the first image and the second image. For example, if a result of performing the comparison indicates a match between one or more unique visual patterns of interstitial material 124 shown in the first image and in the second image, then device 108 may determine that the second set of optical fibers 104 shown in the second image includes an optical fiber 104 that is not expected to be shown in the second image.

Additionally, or alternatively, by performing a comparison of unique visual patterns of interstitial material 124 shown in the first image and the second image, device 108 may determine whether a particular optical fiber 104 is missing from an expected set of optical fibers 104. For example, device 108 may have captured an initial set of images of the entire interstitial material 124 associated with optical cable 102 (e.g., which are stitched together to form a single image), and device 108 may perform a comparison of the first image and/or the second image to this initial set of images to determine whether the first set of optical fibers 104 shown in the first image and/or the second set of optical fibers 104 shown in the second image is missing an expected optical fiber 104. Continuing with the previous example, device 108 may determine that the first set of optical fibers 104 shown in the first image and/or the second set of optical fibers 104 shown in the second image is missing an expected optical fiber 104 based on identifying, in the initial set of images, which optical fibers 104 of optical cable 102 are shown in the first image and/or the second image (e.g., by identifying that consecutive optical fibers 104 are not shown between the first image and the second image).

In this way, device 108 may determine whether a set of optical fibers 104 shown in an image includes an expected set of optical fibers 104. For example, in this way, device 108 may determine whether a set of optical fibers 104 shown in an image includes a duplicate optical fiber 104 shown in another image, is missing an optical fiber 104 that is expected to be included in the set of optical fibers 104, and/or the like.

In some implementations, device 108 may process the first image and/or the second image using an image processing technique in association with performing the comparison. For example, device 108 may process the first image and/or the second image using the age processing technique prior to performing the comparison of the first image and the second image, while performing the comparison of the first image and the second image, and/or the like. In some implementations, an image processing technique may include a feature detection technique, a blob detection technique, a histogram matching technique, a scale-invariant feature transform (SIFT) technique, a simultaneous localization mapping (SLAM) technique, a homography technique, and/or the like.

In some implementations, device 108 may use the image processing technique to identify optical fibers 104 in field of view 118 of camera 116, in the first image and/or the second image, and/or the like. For example, device 108 may use the image processing technique to identify a pattern of concentric rings that is indicative of an optical fiber 104, to determine whether a set of optical fibers 104 in field of view 118 is substantially centered within field of view 118, and/or the like. Additionally, or alternatively, device 108 may use the image processing technique to identify a unique visual pattern of interstitial material 124 shown in the first image and/or the second image. Additionally, or alternatively, device 108 may use the image processing technique to compensate for different angles of capture of the first image and the second image. For example, camera 116 may be moved via a pivot motion about an axis. In this case, images of different sets of optical fibers 104 may be captured from different angles relative to the different sets of optical fibers 104, which increases a difficulty of performing a comparison of the different images. As a result, device 108 may process the different images using an image processing technique to compensate for the different angles at which the different images were captured (e.g., to compensate for distortions of optical fibers 104 and/or interstitial material 124 shown in the different images due to the different angels).

Figure 1F:
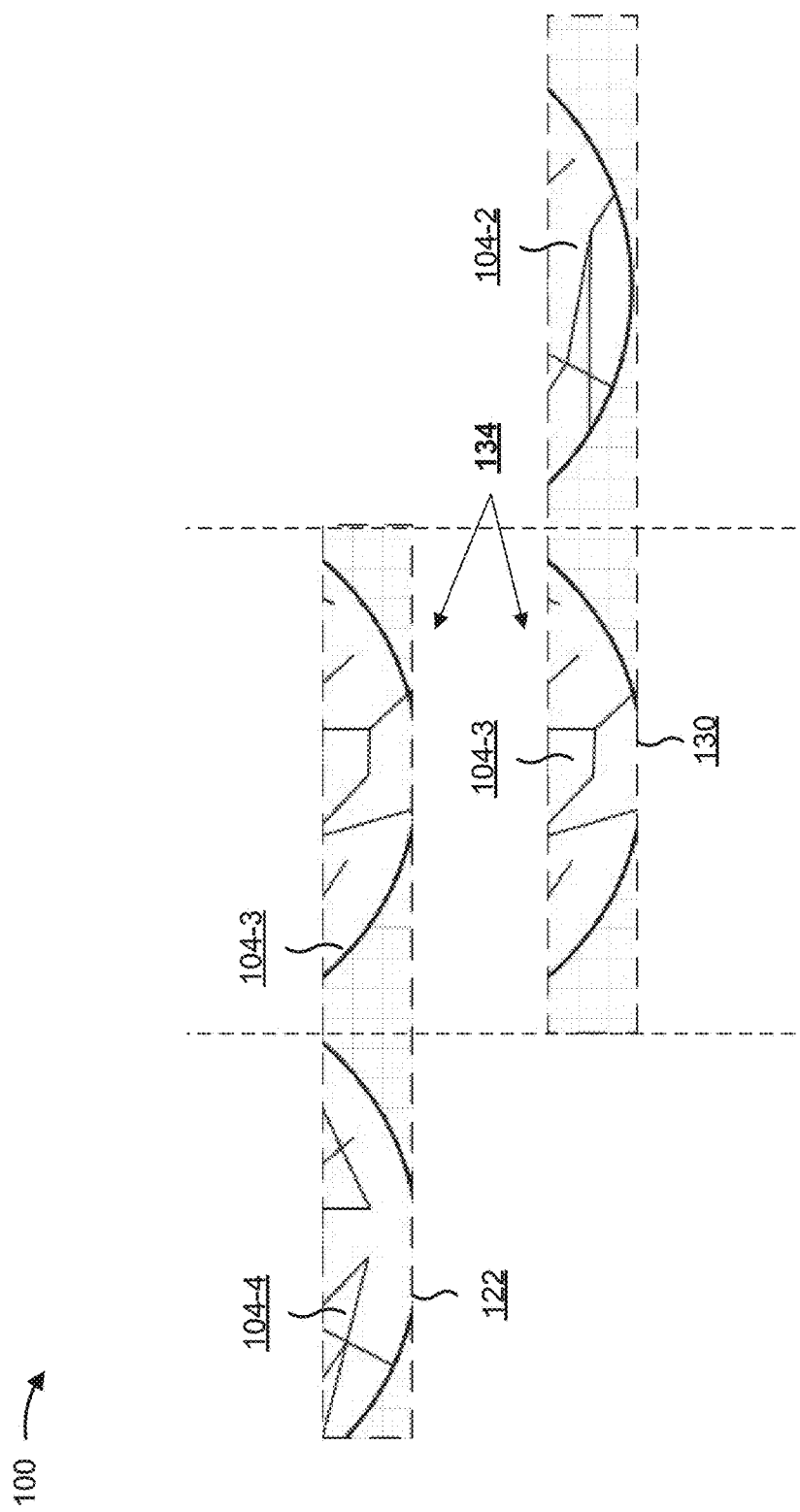

FIG. 1F shows an example of performing a comparison of the first image (shown by reference number 122) and the second image (shown by reference number 130). For example, and as shown by reference number 134, device 108 may align the first image and the second image prior to performing a comparison of the first image and the second image. Continuing with the previous example, and as further shown by reference number 134, device 108 may identify respective portions of the first image and the second image that overlap (e.g., portions that show interstitial material 124 associated with optical fiber 104-3). In this case, device 108 may determine that a set of optical fibers 104 shown in the second image includes an unexpected optical fiber 104 (e.g., optical fiber 104-3) and, as a result, may determine an error in movement of camera 116 (e.g., may determine that camera 116 has not be moved an expected distance due to the first image and the second image showing interstitial material 124 associated with optical fiber 104-3). Similarly, device 108 may determine that optical cable 102 and/or optical connector 106 have not been moved an expected distance in cases when optical cable 102 and/or optical connector 106 are moved relative to camera 116 rather than camera 116 being moved relative to optical cable 102 and/or optical connector 106.

Figure 1G:
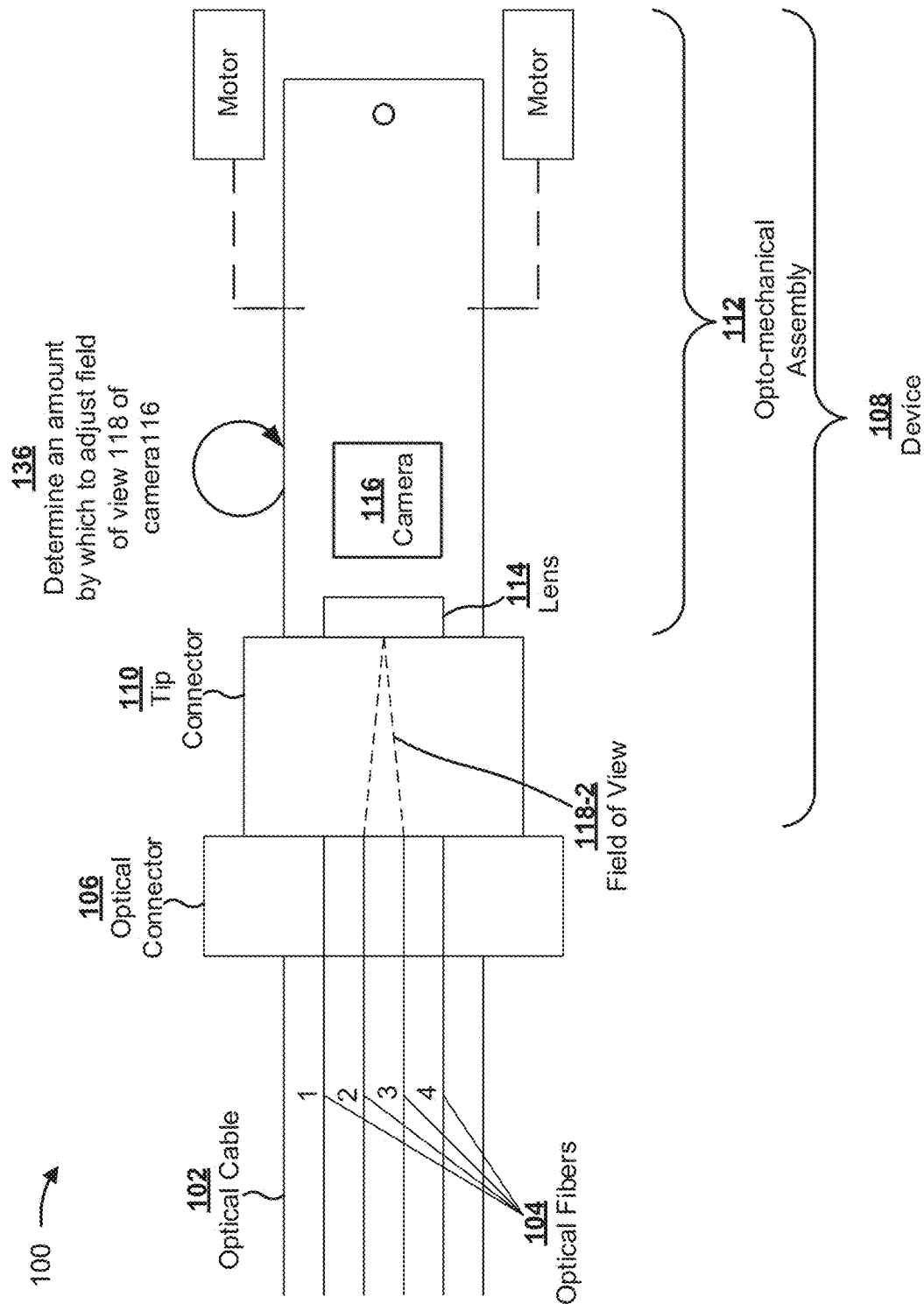

Turning to FIG. 1G, and as shown by reference number 136, device 108 may determine an amount by which to adjust field of view 118 of camera 116. For example, device 108 may determine the amount by which to adjust field of view 118-2 based on determining that the first image and the second image overlap (e.g., an amount by which to move camera 116, an amount by which to move optical cable 102 and/or optical connector 106, and/or the like).

In some implementations, device 108 may determine an amount by which to adjust field of view 118-2 based on an amount by which the first image and the second image overlap. For example, device 108 may determine an amount by which to adjust field of view 118-1 based on a percentage of the first image and the second image that overlap (e.g., a percentage may indicate a distance based on a configuration of optical cable 102, an amount of distance within field of view 118-2, and/or the like), a quantity of pixels that overlap between the first image and the second image (e.g., a pixel may correspond a particular amount of distance shown in an image), and/or the like.

In some implementations, if there is no overlap between the first image and the second image, device 108 may determine an amount by which to adjust field of view 118 based on an expected location of the first image and/or the second image. For example, device 108 may identify an overlap of the first image and the initial set of images described above based on a comparison of the first image and the initial set of images and may identify an overlap between the second image and the initial set of images. Continuing with the previous example, device 108 may determine an amount of distance between the first set of optical fibers 104 shown in the first image and the second set of optical fibers 104 shown in the second image based on identifying the overlaps between the first image and the initial set of images and between the second image and the initial set of images. As specific examples, device 108 may determine a quantity of pixels between the first image and the second image based on identifying the overlaps, may determine a quantity of optical fibers 104 between the first set of optical fibers 104 shown in the first image and the second set of optical fibers 104 shown in the second image based on identifying the overlaps, and/or the like.

FIG. 1H shows an example of determining an amount by which to adjust field of view 118-2 of camera 116. As shown by reference number 138, device 108 may determine a quantity of pixels that overlap between the first image (shown by reference number 122) and the second image (shown by reference number 130). In this case, for example, each pixel may show a particular distance of optical cable 102 (e.g., based on a configuration of optical cable 102, based on a distance of camera 116 from optical cable 102, based on an amount of zoom implemented by camera 116, based on a resolution of camera 116, and/or the like). For example, the further camera 116 is from optical cable 102, the less zoom implemented by camera 116, the less resolution of camera 116, and/or the like, the more distance each pixel may show.

Figure 1I:
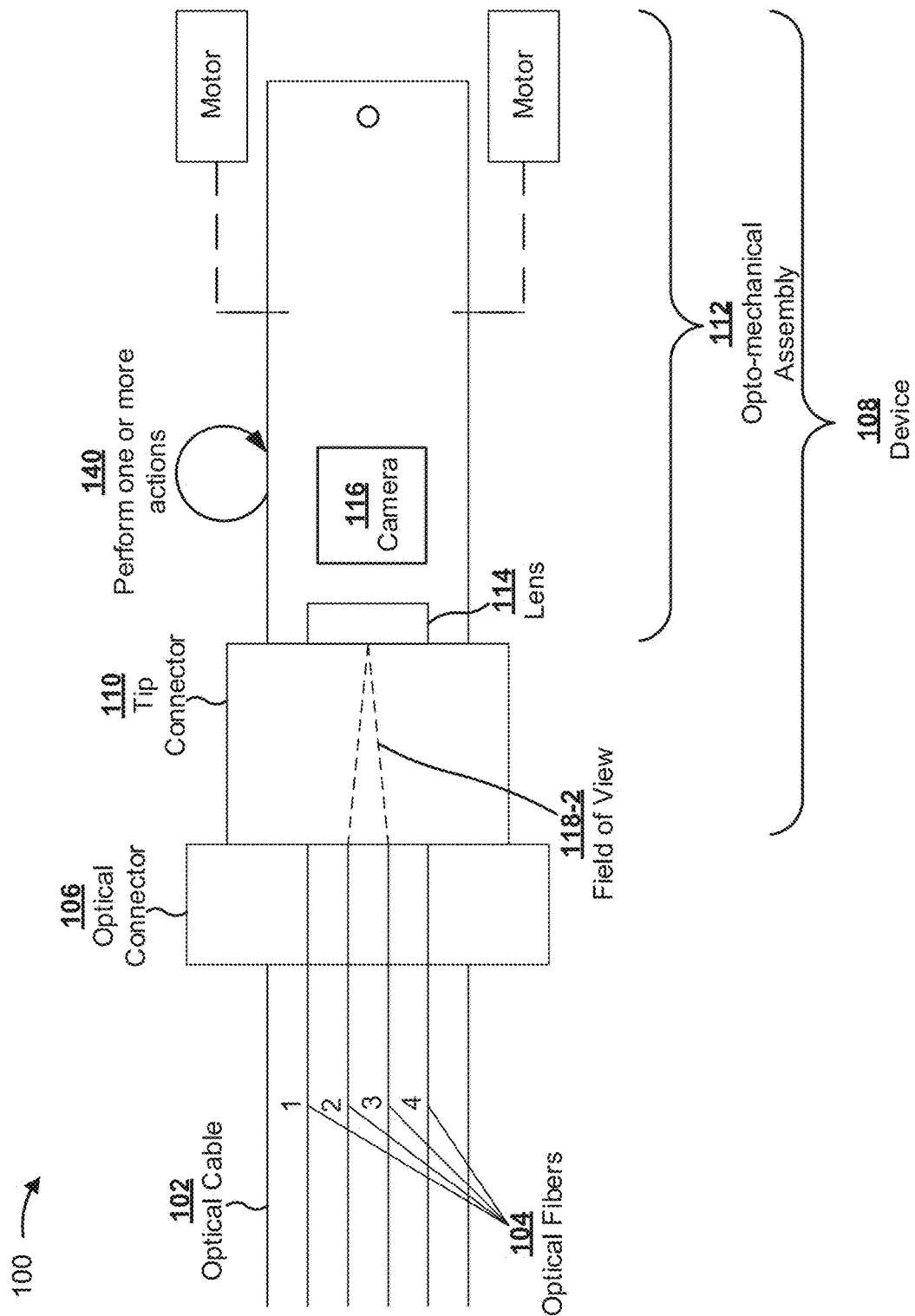

Turning to FIG. 1I, and as shown by reference number 140, device 108 may perform one or more actions. For example, device 108 may perform one or more actions after determining the amount by which to adjust field of view 118-2 of camera 116.

In some implementations, device 108 may move camera 116 (and/or may move optical cable 102 and/or optical connector 106) by the amount by which field of view 118-2 is to be adjusted (e.g., may move camera 116 in a particular direction by the amount). Additionally, or alternatively, device 108 may move camera 116 (and/or may move optical cable 102 and/or optical connector 106) to a previous position associated with the first image and may move camera 116 based on the amount by which field of view 118-2 is to be adjusted. Additionally, or alternatively, device 108 may output a notification for display that includes information indicating that device 108 has identified an error in movement of camera 116 (and/or an error in movement of optical cable 102 and/or optical connector 106). Additionally, or alternatively, device 108 may trigger an alarm (e.g., may output a sound, may activate a light, and/or the like) to indicate that device 108 has identified an error in movement of camera 116. Additionally, or alternatively, device 108 may send a message (e.g., a text message, an email, and/or the like) to another device (e.g., a user device, such as a mobile phone, a desktop computer, and/or the like) that includes information indicating that device 108 has identified an error in movement of camera 116.

In some implementations, device 108 may store information that includes a timestamp for an identified error, an amount by which field of view 118-2 was adjusted, a type of optical cable 102 of which images were being captured (e.g., a size of optical cable 102, a configuration of optical fibers 104 included in optical cable 102, and/or the like), and/or the like. For example, device 108 may process this information to identify a trend related to errors identified in movement of camera 116, such as errors over time, which may indicate that mechanical components of device 108 need to receive maintenance services, errors with respect to particular types of optical cables 102, which may indicate that device 108 needs to be specifically configured for those types of optical cables 102, and/or the like.

In this way, device 108 may detect when device 108 has erroneously captured an image of an optical fiber 104 and/or has failed to capture an image of an optical fiber 104. This improves capturing of a set of images of optical fibers 104 of optical cable 102 by reducing or eliminating errors related to capturing the set of images. In addition, this conserves memory resources of device 108 by reducing or eliminating storage, by device 108, of images that show a same optical fiber 104. Further, this increases an efficiency of capturing images of optical fibers 104 of optical cable 102 by reducing or eliminating a need for a user of device 108 to manually review the images to determine whether any errors are present in the images. Further, this provides an efficient and automatic way to correct for errors in movement of camera 116 that are due to operator error, a mis-configuration of device 108, and/or the like.

As indicated above, FIGS. 1A-1I are provided merely as an example. Other examples are possible and may differ from what was described with regard to FIGS. 1A-1I. Although some implementations described with regard to FIGS. 1A-1I include performing a comparison of two images, the implementations apply equally to performing a comparison of any number of images, such as three images, four images, etc.

In addition, although some implementations describe moving camera 116 to modify field of view 118 of camera 116, some implementations may include moving optical cable 102 (and/or optical connector 106 associated with optical cable 102) to modify field of view 118 of camera 116. For example, optical cable 102 (and/or optical connector 106) and camera 116 may be moved relative to each other via a relative movement to cause field of view 118 of camera 116 to be modified. Continuing with the previous example, a relative movement may include a movement of optical cable 102 (and/or optical connector 106) relative to camera 116, a movement of camera 116 relative to optical cable 102 (and/or optical connector 106), and/or a combination of a movement of optical cable 102 (and/or optical connector 106) relative to camera 116 and a movement of camera 116 relative to optical cable 102 (and/or optical connector 106). In some implementations, device 108 may include one or more components that are configured to move optical cable 102 (and/or optical connector 106 associated with optical cable 102). In other words, descriptions of movement of camera 116, descriptions of modification of a position of camera 116, and/or the like equally apply to a movement and/or modification of a position of optical cable 102, optical connector 106, and/or the like.

In addition, although FIGS. 1A-1I describe an example of using a unique visual pattern of interstitial material shown in images to adjust a positioning of optical cable 102 and/or camera 116, other uses of the unique visual pattern are possible. For example, the unique visual pattern, which may uniquely identify optical cable 102 and/or a particular optical fiber 104 of optical cable 102, can be used to track a location of installation of optical cable 102 and/or optical fiber 104, to verify that a technician is performing scheduled maintenance and/or servicing of optical cable 102 and/or optical fiber 104, to schedule maintenance and/or servicing of optical cable 102 and/or optical fiber 104 (e.g., via communication between device 108 and a client/server device), and/or the like.

Figure 2:
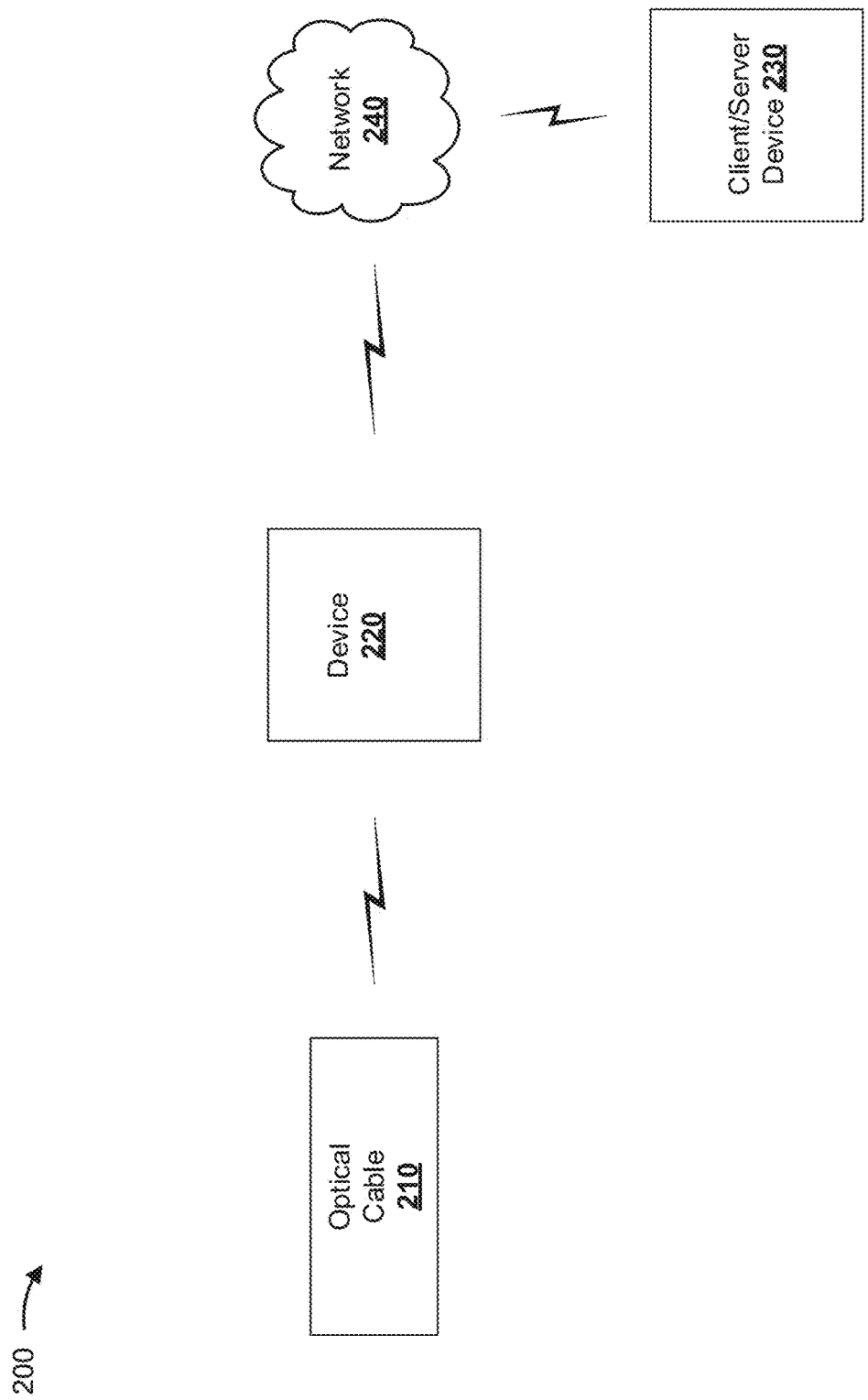
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include optical cable 210, device 220, a client device or a server device (hereinafter referred to as client/server device 230), and network 240. Devices of environment 200 may interconnect via wired connections, wireless connections, or a combination of wired and wireless connections.

Optical cable 210 includes a cable containing one or more optical fibers that are to be used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein.

Device 220 includes one or more devices capable of capturing, receiving, storing, generating, processing, and/or providing an image of an optical fiber of optical cable 210. For example, device 220 may include an optical probe, an optical fiber microscope, a fault locator, an optical fiber inspection microscope, and/or a similar type of device. In some implementations, device 220 may move a camera of optical cable 210 and may capture an image of a set of optical fibers within a field of view of the camera, as described elsewhere herein. Additionally, or alternatively, device 220 may detect an error in capturing an image of a set of optical fibers of an optical cable, as described elsewhere herein.

Client/server device 230 includes one or more devices capable of receiving, generating, storing, processing, and/or providing an image of an optical fiber of an optical cable. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive an image captured by device 220, as described elsewhere herein.

Network 240 includes one or more wired and/or wireless networks. For example, network 240 may include a wireless network (e.g., a long-term evolution (LTE) network, a code division multiple access (CDMA) network, a 3G network, a 4G network, a 5G network, a Wi-Fi network, or another type of wireless network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
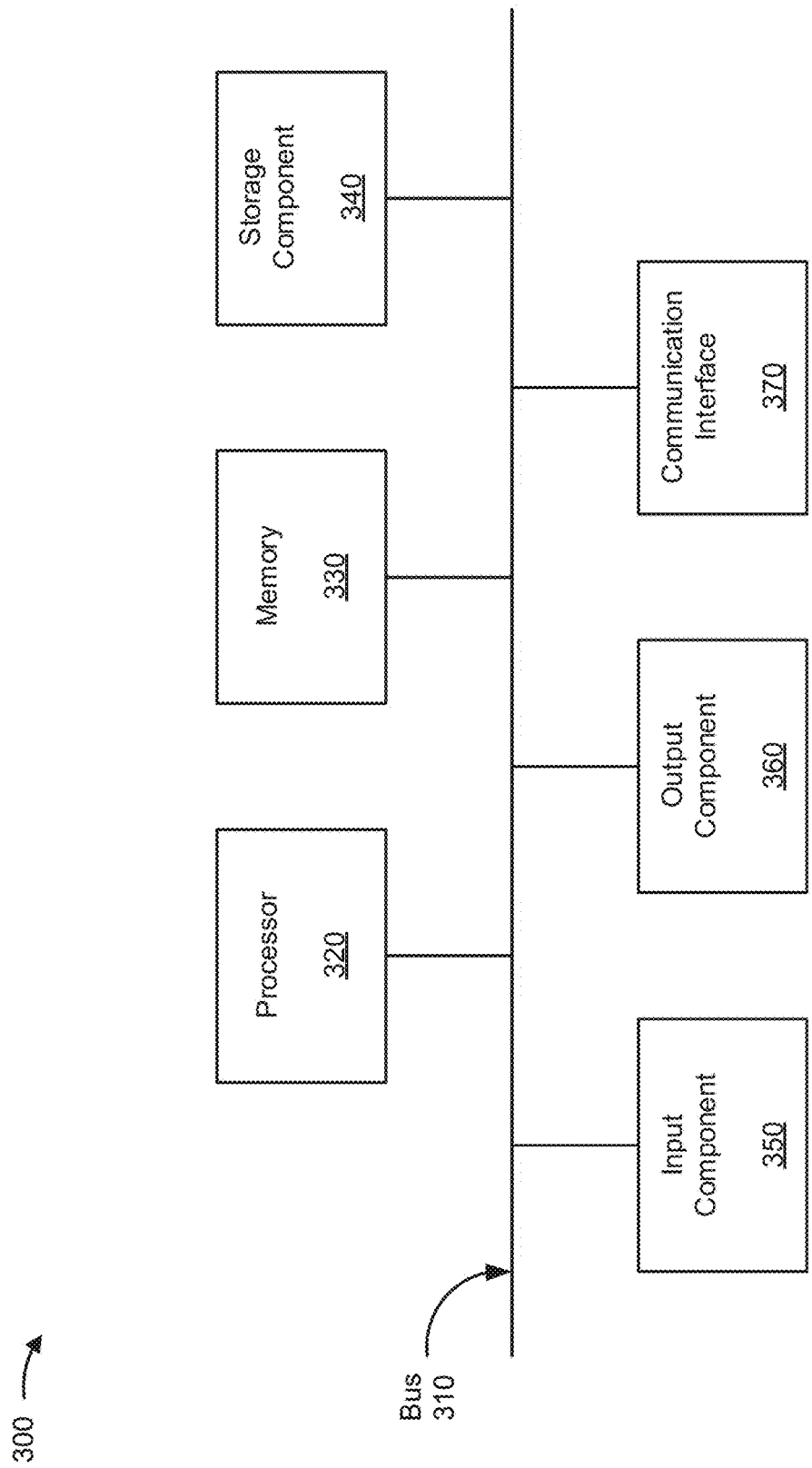
FIG. 3 is a diagram of example components of one or more devices of FIG. 2.

FIG. 3 is a diagram of example components of a device 300. Device 300 may correspond to device 220 and/or to client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 310 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
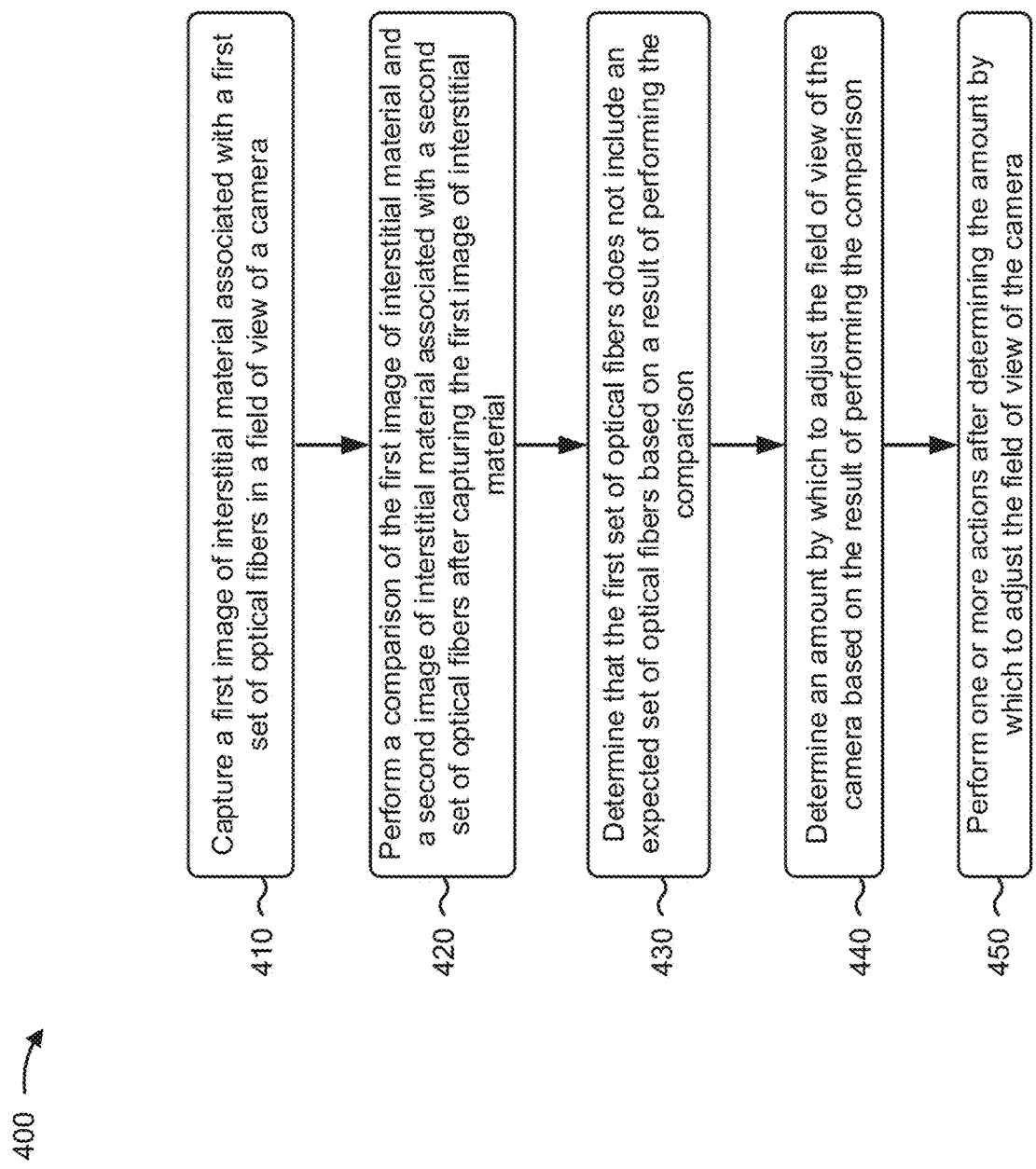
FIG. 4 is a flow chart of an example process for determining an erroneous movement of a microscope.

FIG. 4 is a flow chart of an example process 400 for determining an erroneous movement of a microscope. In some implementations, one or more process blocks of FIG. 4 may be performed by a device (e.g., device 220). In some implementations, one or more process blocks of FIG. 4 may be performed by another device or a group of devices separate from or including the device, such as a client/server device (e.g., client/server device 230).

As shown in FIG. 4, process 400 may include capturing a first image of interstitial material associated with a first set of optical fibers in a field of view of a camera (block 410). For example, the device (e.g., device 220 using camera 116, processor 320, and/or the like) may capture, using a camera associated with a microscope, a first image of interstitial material associated with a first set of optical fibers in a field of view of the camera, in a manner that is the same as or similar to that described with regard to FIGS. 1A-1I.

As further shown in FIG. 4, process 400 may include performing a comparison of the first image of interstitial material and a second image of interstitial material associated with a second set of optical fibers after capturing the first image of interstitial material (block 420). For example, the device (e.g., device 220 using processor 320, memory 330, and/or the like) may perform a comparison of the first image of interstitial material and a second image of interstitial material associated with a second set of optical fibers after capturing the first image of interstitial material, in a manner that is the same as or similar to that described with regard to FIGS. 1A-1I.

As further shown in FIG. 4, process 400 may include determining that the first set of optical fibers does not include an expected set of optical fibers based on a result of performing the comparison (block 430). For example, the device (e.g., device 220 using processor 320) may determine that the first set of optical fibers does not include an expected set of optical fibers based on a result of performing the comparison, in a manner that is the same as or similar to that described with regard to FIGS. 1A-1I.

As further shown in FIG. 4, process 400 may include determining an amount by which to adjust the field of view of the camera based on the result of performing the comparison (block 440). For example, the device (e.g., device 220 using processor 320) may determine an amount by which to adjust the field of view of the camera based on the result of performing the comparison, in a manner that is the same as or similar to that described with regard to FIGS. 1A-1I.

As further shown in FIG. 4, process 400 may include performing one or more actions after determining the amount by which to adjust the field of view of the camera (block 450). For example, the device (e.g., device 220 using processor 320, memory 330, storage component 340, output component 360, communication interface 370, and/or the like) may perform one or more actions after determining the amount by which to adjust the field of view of the camera, in a manner that is the same as or similar to that described with regard to FIGS. 1A-1I.

Process 400 may include additional implementations, such as any single implementation or any combination of implementations described below and/or in connection with one or more other processes described elsewhere herein.

In some implementations, the device may perform an alignment of the first image and the second image to identify an overlapping area of the first image and the second image, and may determine the amount by which to adjust the field of view of the camera based on the overlapping area. In some implementations, the device may determine that the first set of optical fibers includes a same optical fiber as the second set of optical fibers, or may determine that an expected optical fiber is not included in the first set of optical fibers.

In some implementations, the device may determine the amount based on: the first set of optical fibers including the same optical fiber, or the expected optical fiber being not included in the first set of optical fibers. In some implementations, the device may perform the comparison utilizing at least one of: a feature detection technique, a blob detection technique, a histogram matching technique, a scale-invariant feature transform (SIFT) technique, or a simultaneous localization and mapping (SLAM) technique.

In some implementations, the device may determine that the first set of optical fibers is substantially centered in the field of view of the camera prior to capturing the first image, and may capture the first image of interstitial material after determining that the first set of optical fibers is substantially centered in the field of view of the camera. In some implementations, the device may determine that the first image is to show the interstitial material associated with the first set of optical fibers prior to capturing the first image, and may capture the first image of interstitial material after determining that the first image is to show the interstitial material associated with the first set of optical fibers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
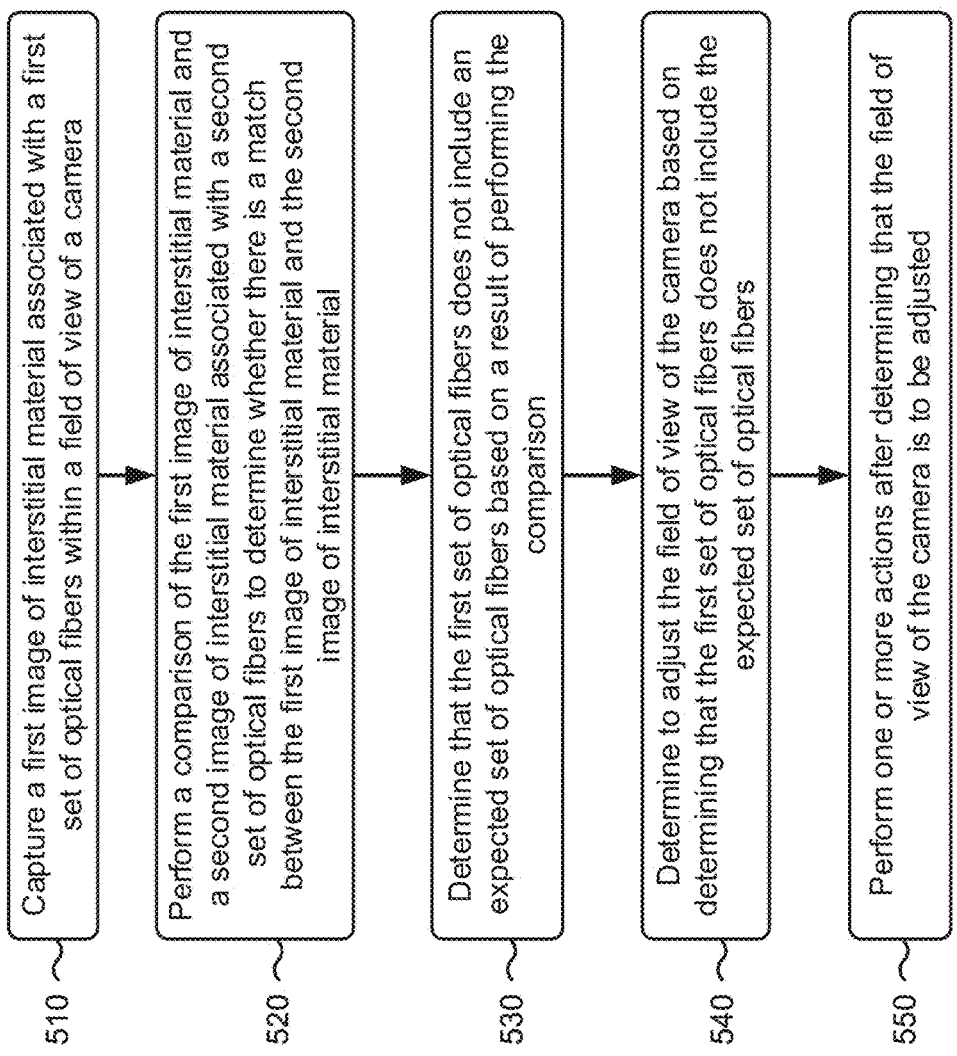
FIG. 5 is a flow chart of an example process for determining an erroneous movement of a microscope.

FIG. 5 is a flow chart of an example process 500 for determining an erroneous movement of a microscope. In some implementations, one or more process blocks of FIG. 5 may be performed by a device (e.g., device 220). In some implementations, one or more process blocks of FIG. 5 may be performed by another device or a group of devices separate from or including the device, such as a client/server device (e.g., client/server device 230).

As shown in FIG. 5, process 500 may include capturing a first image of interstitial material associated with a first set of optical fibers within a field of view of a camera (block 510). For example, the device (e.g., device 220 using camera 116, processor 320, and/or the like) may capture a first image of interstitial material associated with a first set of optical fibers within a field of view of a camera, in a manner that is the same as or similar to that described with regard to FIGS. 1A-1I.

As further shown in FIG. 5, process 500 may include performing a comparison of the first image of interstitial material and a second image of interstitial material associated with a second set of optical fibers to determine whether there is a match between the first image of interstitial material and the second image of interstitial material (block 520). For example, the device (e.g., device 220 using processor 320, memory 330, and/or the like) may perform a comparison of the first image of interstitial material and a second image of interstitial material associated with a second set of optical fibers to determine whether there is a match between the first image of interstitial material and the second image of interstitial material, in a manner that is the same as or similar to that described with regard to FIGS. 1A-1I.

As further shown in FIG. 5, process 500 may include determining that the first set of optical fibers does not include an expected set of optical fibers based on a result of performing the comparison (block 530). For example, the device (e.g., device 220 using processor 320, and/or the like) may determine that the first set of optical fibers does not include an expected set of optical fibers based on a result of performing the comparison, in a manner that is the same as or similar to that described with regard to FIGS. 1A-1I.

As further shown in FIG. 5, process 500 may include determining to adjust the field of view of the camera based on determining that the first set of optical fibers does not include the expected set of optical fibers (block 540). For example, the device (e.g., device 220 using processor 320, and/or the like) may determine to adjust the field of view of the camera based on determining that the first set of optical fibers does not include the expected set of optical fibers, in a manner that is the same as or similar to that described with regard to FIGS. 1A-1I.

As further shown in FIG. 5, process 500 may include performing one or more actions after determining that the field of view of the camera is to be adjusted (block 550). For example, the device (e.g., device 220 using processor 320, memory 330, output component 360, communication interface 370, and/or the like) may perform one or more actions after determining that the field of view of the camera is to be adjusted, in a manner that is the same as or similar to that described with regard to FIGS. 1A-1I.

Process 500 may include additional implementations, such as any single implementation or any combination of implementations described below and/or in connection with one or more other processes described elsewhere herein.

In some implementations, the device may determine that the field of view of the camera needs to be moved in a particular direction after determining to adjust the field of view of the camera, and may perform a relative movement of the camera and an optical connector in the particular direction to adjust the field of view of the camera after determining to adjust the field of view of the camera, wherein the optical connector is associated with the first set of optical fibers and the second set of optical fibers. In some implementations, the device may determine that the first set of optical fibers is within the field of view of the camera prior to capturing the first image, and may capture the first image of interstitial material after determining that the first set of optical fibers is within the field of view of the camera.

In some implementations, the device may determine that the first set of optical fibers includes at least one optical fiber that overlaps with the second set of optical fibers, or may determine that the first set of optical fibers fails to include an expected optical fiber. In some implementations, the device may perform the comparison to determine that a first unique visual signature of interstitial material in the first image of interstitial material matches a second unique visual signature of interstitial material in the second image of interstitial material, and may determine to adjust the field of view of the camera based on the first unique visual signature of interstitial material matching the second unique visual signature of interstitial material.

In some implementations, the device may perform the comparison by determining whether respective portions of the first image and the second image overlap. In some implementations, the device may determine that the camera and an optical connector have been moved relative to each other by less than a particular amount or more than the particular amount after performing the comparison, wherein the optical connector is associated with the first set of optical fibers and the second set of optical fibers, and may determine to adjust the field of view of the camera after determining that the camera and the optical connector have been moved relative to each other by less than the particular amount or more than the particular amount.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
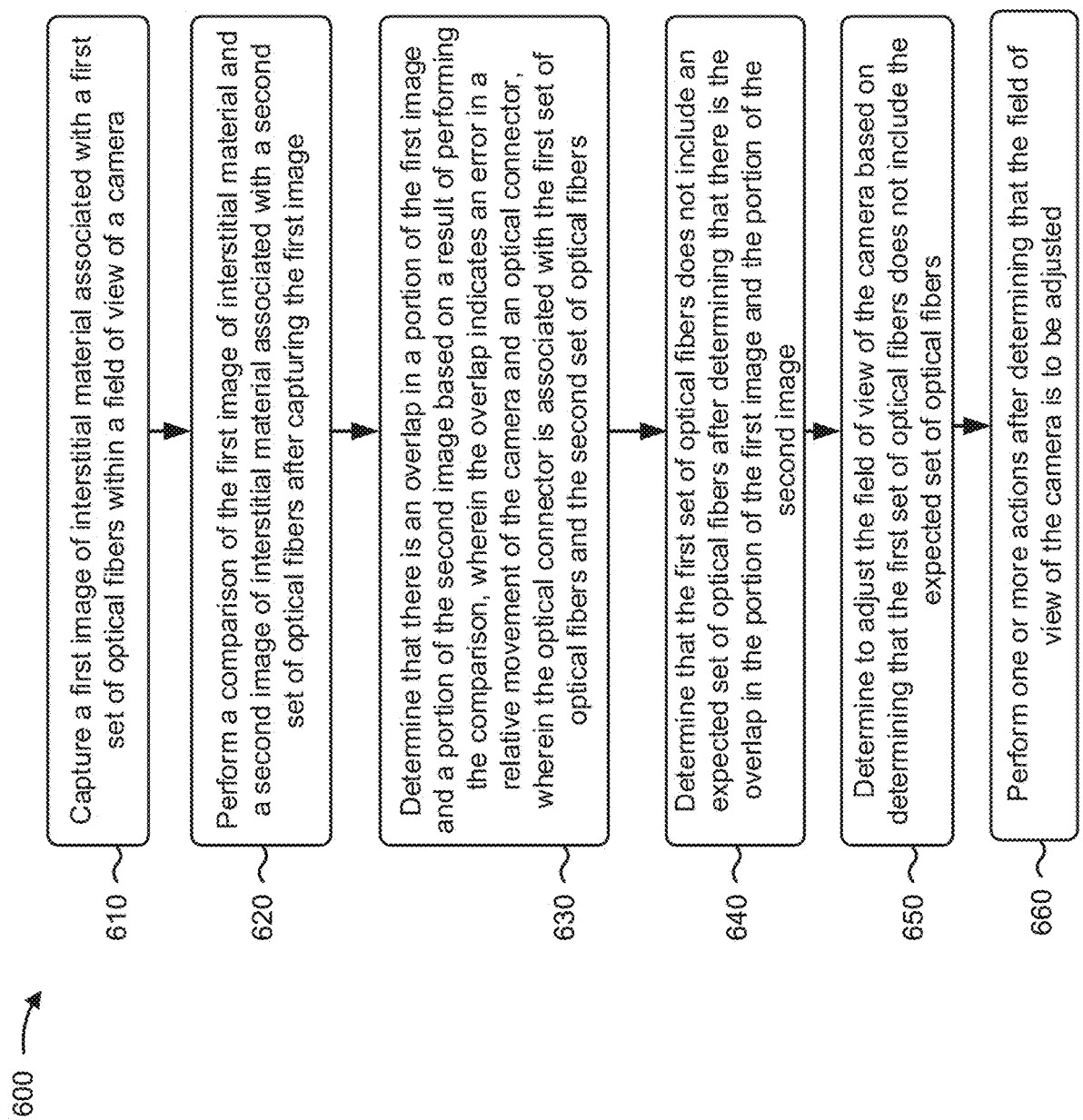
FIG. 6 is a flow chart of an example process for determining an erroneous movement of a microscope.

FIG. 6 is a flow chart of an example process 600 for determining an erroneous movement of a microscope. In some implementations, one or more process blocks of FIG. 6 may be performed by the device (e.g., device 220). In some implementations, one or more process blocks of FIG. 6 may be performed by another device or a group of devices separate from or including the device, such as a client/server device (e.g., client/server device 230).

As shown in FIG. 6, process 600 may include capturing a first image of interstitial material associated with a first set of optical fibers within a field of view of a camera (block 610). For example, the device (e.g., device 220 using camera 116, processor 320, and/or the like) may capture a first image of interstitial material associated with a first set of optical fibers within a field of view of a camera, in a manner that is the same as or similar to that described with regard to FIGS. 1A-1I.

As further shown in FIG. 6, process 600 may include performing a comparison of the first image of interstitial material and a second image of interstitial material associated with a second set of optical fibers after capturing the first image (block 620). For example, the device (e.g., device 220 using processor 320, and/or the like) may perform a comparison of the first image of interstitial material and a second image of interstitial material associated with a second set of optical fibers after capturing the first image, in a manner that is the same as or similar to that described with regard to FIGS. 1A-1I.

As further shown in FIG. 6, process 600 may include determining that there is an overlap in a portion of the first image and a portion of the second image based on a result of performing the comparison, wherein the overlap indicates an error in a relative movement of the camera and an optical connector, wherein the optical connector is associated with the first set of optical fibers and the second set of optical fibers (block 630). For example, the device (e.g., device 220 using processor 320, and/or the like) may determine that there is an overlap in a portion of the first image and a portion of the second image based on a result of performing the comparison, in a manner that is the same as or similar to that described with regard to FIGS. 1A-1I. In some implementations, the overlap indicates an error in a relative movement of the camera and an optical connector. In some implementations, the optical connector is associated with the first set of optical fibers and the second set of optical fibers.

As further shown in FIG. 6, process 600 may include determining that the first set of optical fibers does not include an expected set of optical fibers after determining that there is the overlap in the portion of the first image and the portion of the second image (block 640). For example, the device (e.g., device 220 using processor 320, and/or the like) may determine that the first set of optical fibers does not include an expected set of optical fibers after determining that there is the overlap in the portion of the first image and the portion of the second image, in a manner that is the same as or similar to that described with regard to FIGS. 1A-1I.

As further shown in FIG. 6, process 600 may include determining to adjust the field of view of the camera based on determining that the first set of optical fibers does not include the expected set of optical fibers (block 650). For example, the device (e.g., device 220 using processor 320, and/or the like) may determine to adjust the field of view of the camera based on determining that the first set of optical fibers does not include the expected set of optical fibers, in a manner that is the same as or similar to that described with regard to FIGS. 1A-1I.

As further shown in FIG. 6, process 600 may include performing one or more actions after determining that the field of view of the camera is to be adjusted (block 660). For example, the device (e.g., device 220 using processor 320, memory 330, output component 360, communication interface 370, and/or the like) may perform one or more actions after determining that the field of view of the camera is to be adjusted, in a manner that is the same as or similar to that described with regard to FIGS. 1A-1I.

Process 600 may include additional implementations, such as any single implementation or any combination of implementations described below and/or in connection with one or more other processes described elsewhere herein.

In some implementations, the device may determine that the first set of optical fibers is within the field of view of the camera prior to capturing the first image, and may determine that the first set of optical fibers is substantially centered within the field of view of the camera prior to capturing the first image. In some implementations, the device may capture the first image of interstitial material after determining that the first set of optical fibers is within the field of view of the camera.

In some implementations, the device may determine that a quantity of pixels overlap in the first image and the second image after performing the comparison, and may determine an amount by which to adjust the field of view of the camera based on the quantity of pixels that overlap in the first image and the second image. In some implementations, the device may perform the comparison after processing the first image and the second image using an image processing technique.

In some implementations, the device may determine an amount by which to adjust the field of view of the camera to eliminate the overlap in the portion of the first image and the portion of the second image after determining to adjust the field of view of the camera. In some implementations, the device may perform another relative movement of the camera and the optical connector by the amount to adjust the field of view of the camera after determining the amount by which to adjust the field of view of the camera.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
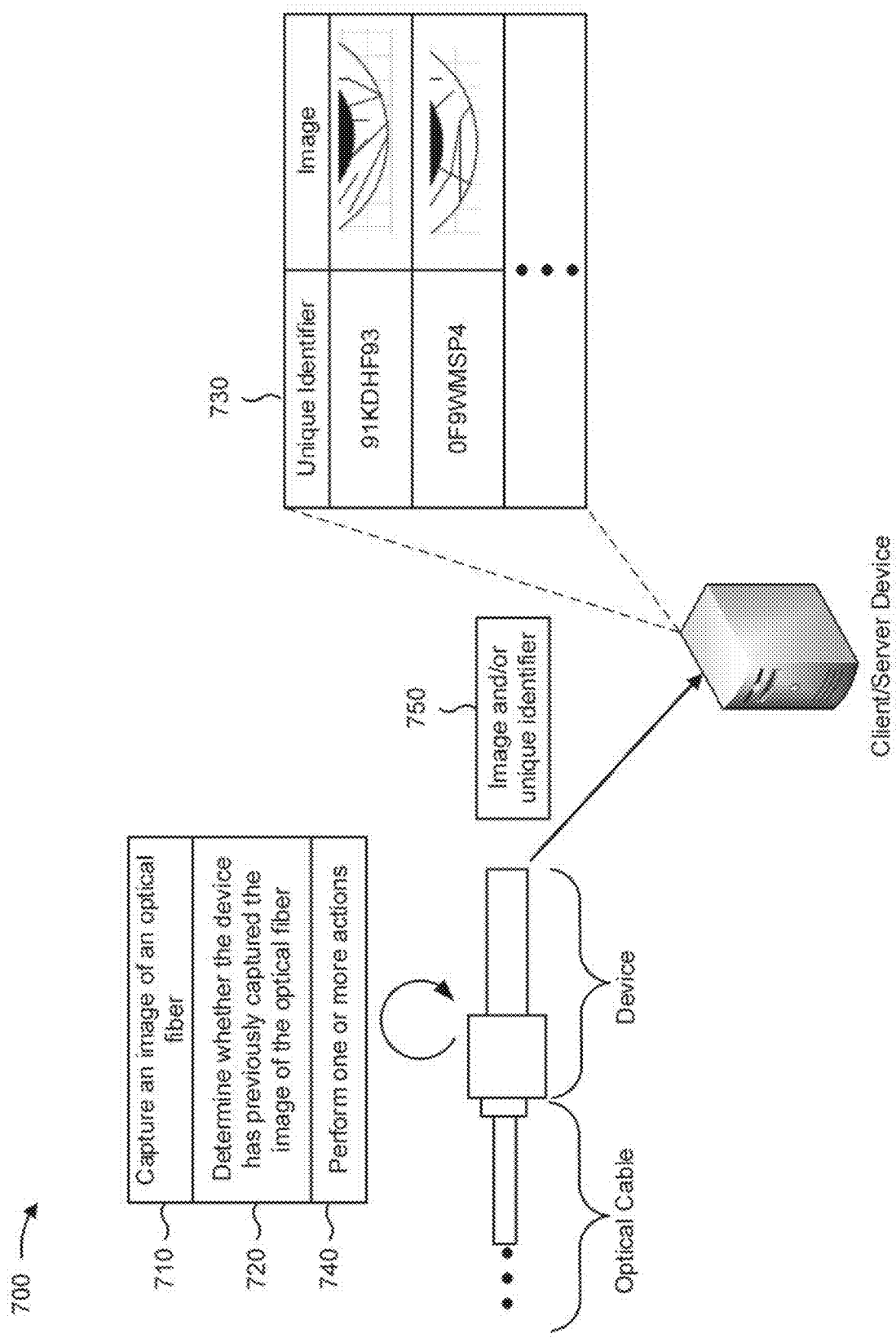
FIG. 7 is a diagram of an example implementation described herein.

FIG. 7 is a diagram of an example implementation 700 described herein. FIG. 7 shows an example of determining and/or utilizing a unique identifier for an optical fiber. As shown, implementation 700 may include an optical cable (e.g., optical cable 102, optical cable 210, and/or the like), a device (e.g., device 108, device 220, and/or the like), and a client/server device (e.g., client/server device 230).

As shown by reference number 710, the device may capture an image of an optical fiber (e.g., an optical fiber 104) included in the optical cable, in a manner similar to that described elsewhere herein. For example, the device may capture an image of interstitial material associated with the optical fiber.

As shown by reference number 720, the device may determine whether the device has previously captured the image of the optical fiber. For example, the device may perform a comparison of the image of the optical fiber captured by the device and other images of optical fibers stored by the client/server device (e.g., the images shown in association with reference number 730). Continuing with the previous example, the device may have processed the image of the optical fiber to identify a unique visual pattern in the interstitial material associated with the optical fiber and may perform a comparison of the unique visual pattern with other unique visual patterns shown in the other images stored by the client/server device. In some implementations, the device may determine that the device has previously captured an image of the optical fiber if a result of the comparison indicates a match between the image and another image stored by the client/server device.

Additionally, or alternatively, and as another example, the device may determine a unique identifier for the optical fiber captured in the image and may perform a comparison of the unique identifier for the optical fiber and other unique identifiers stored by the client/server device for other images of other optical fibers (e.g., the unique identifiers associated with reference number 730). In some implementations, the device may process the unique visual pattern of interstitial material shown in the image to generate the unique identifier for the optical fiber. For example, and when generating the unique identifier, the device may determine a quantity, size, and/or location of defects and/or deformations that cause the unique visual pattern (e.g., by utilizing an image processing technique to determine a quantity and/or size of the defects and/or deformations, by overlaying a grid on the image to determine a location of the defects and/or deformations, and/or the like) and may assign values to the defects and/or deformations shown in the image based on the quantity, size and/or location of the defects and/or deformations. In some implementations, the device may process the values for each optical fiber using a function, may combine the values, and/or the like to generate a unique identifier for the optical fiber shown in the image.

In some implementations, the device may perform a comparison of the unique identifier for optical fiber and other unique identifiers stored by the client/server device to determine whether the device has previously captured an image of the optical fiber. For example, the device may communicate with the client/server device, such as by providing the unique identifier to the client/server device, by querying a data structure stored in memory resources of the client/server device (e.g., by including the unique identifier as a term in a search query), and/or the like to facilitate performance of the comparison.

In some implementations, and as described below, the device may perform one or more actions based on whether a result of performing the comparison indicates a match. For example, the device may perform one or more actions based on whether the device determines that the device has previously captured an image of the optical fiber based on a unique visual pattern of interstitial material shown in the image and associated with the optical fiber, based on a unique identifier determined for the optical fiber, and/or the like.

As shown by reference number 740, the device may perform one or more actions based on whether a result of performing the comparison indicates a match. In some implementations, and as shown by reference number 750, the device may store (e.g., in a data structure stored in memory resources of the client/server device) the image and/or a unique identifier for the image and/or the optical fiber shown in the image. For example, the unique identifier may have been generated based on defects and/or deformations shown in the image, as described elsewhere herein, utilizing a random alphanumeric sequence generator, and/or the like.

Additionally, or alternatively, the device may store a result of an analysis of the optical fiber. For example, the device may store a result in a data structure stored by the client/server device, such that the record in the data structure for the result is linked to the unique identifier for the optical fiber. Additionally, or alternatively, and as another example, the device may store a log related to an analysis performed by the device, such as a date of the analysis, a time of the analysis, a location of the analysis, a user of the device at the time of the analysis, and/or the like in a data structure stored by the client/server device.

Additionally, or alternatively, the device may populate a user interface provided for display via a display associated with the device with information related to an optical fiber captured in the image (and/or an optical cable in which the optical fiber is included). For example, the device may populate the user interface with a historical log of previous images of the optical fiber and/or the optical cable, historical results of analyses of the optical fiber and/or the optical cable, information related to an intended deployment of the optical fiber and/or the optical cable (e.g., a device to which the optical fiber and/or the optical cable is to be connected, a location at which the optical fiber and/or the optical cable is to be deployed, an intended orientation of the optical cable and/or the optical fiber, and/or the like), a configuration of the optical cable (e.g., a quantity of optical fibers included in the optical cable), a manufacturing date of the optical cable, a maintenance schedule for the optical cable and/or the optical fiber, and/or the like.

Additionally, or alternatively, the device may perform an analysis of the optical fiber captured in the image. For example, the device may process the image to identify defects and/or deformations associated with the optical fiber, to determine whether the optical fiber and/or an optical cable in which the optical fiber is included are properly oriented (e.g., by identifying an orientation marker in the image), and/or the like. In some implementations, the device may output a result of the analysis for display via a display associated with the device, may send a message to the client/server device that includes the result of performing the analysis, and/or the like.

Additionally, or alternatively, the device may schedule maintenance and/or servicing for the optical cable and/or the optical fiber. For example, the device may detect that the optical cable and/or the optical fiber is receiving maintenance and/or servicing based on input to the device and may communicate with the client/server device to schedule subsequent maintenance and/or servicing for the optical cable and/or optical fiber. Additionally, or alternatively, and as another example, the device may detect a defect and/or deformation associated with the optical cable and/or the optical fiber, an erroneous installation of the optical cable and/or the optical fiber, and/or the like based on performing an analysis of the optical cable and/or the optical fiber, and may schedule maintenance and/or servicing by communicating with the client/server device, may output information to instruct a technician to perform maintenance and/or servicing, and/or the like.

In this way, the device may generate a unique identifier for an optical fiber and/or an optical cable and may utilize this unique identifier to perform various actions specific to the optical fiber and/or to the optical cable, in a manner not previously possible. This improves an analysis of an optical fiber and/or an optical cable, aids a technician servicing an optical fiber and/or an optical cable, facilitates verifiability of maintenance and/or servicing of an optical fiber and/or an optical cable, and/or the like.

As indicated above, FIG. 7 is proved merely as an example. Other examples are possible and may differ from what was described with regard to FIG. 7.

In this way, the device may process images of optical fibers of an optical cable to determine whether the device captured duplicate images of an optical fiber, failed to capture an image of an optical fiber, and/or the like. This reduces or eliminates a need for a user of the device to manually review images of optical fibers to determine whether an error is present in the movement of a camera of the device, thereby improving an efficiency related to detecting an error in the movement. In addition, by providing an automatic way to detect errors in a movement of the device, time resources related to capturing images of optical fibers of an optical cable may be conserved. Further, this improves an accuracy of capturing images of optical fibers of an optical cable, thereby improving capture of the images.

Further, some implementations described herein facilitate faster and/or more accurate re-inspection of a set of optical fibers via unique identification of the set of optical fibers. Further, some implementations described herein facilitate more accurate and/or verifiable inspection of optical fibers and/or reporting of inspection via unique identification of a set of optical fibers. Further, some implementations described herein provide a way to uniquely identify an optical fiber for link aggregation diagnostics, tracking of the optical fiber after rotation of an optical connector, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    performing, by a microscope, a comparison of a first image of interstitial material and a second image of interstitial material captured by a single camera associated with the microscope,
        wherein performing the comparison comprises: using the first image and the second image to determine whether the single camera has moved an expected distance;
    determining, by the microscope and based on performing the comparison, that an error has occurred with respect to movement of the single camera;
    determining, by the microscope and based on determining that the error has occurred, an amount by which to adjust a field of view of the single camera; and
    performing, by the microscope and based on determining the amount by which to adjust the field of view, one or more actions associated with the microscope.

2. The method of claim 1, wherein performing the comparison comprises:
    identifying a match between one or more unique visual patterns of the interstitial material in the first image and the second image, and
    determining a same optical fiber is shown in both the first image and the second image.

3. The method of claim 1, wherein performing the comparison comprises:
    determining that a first set of optical fibers, shown in the first image, is missing an expected optical fiber, or determining that a second set of optical fibers, shown in the second image, is missing the expected optical fiber.

4. The method of claim 1, wherein performing the comparison comprises:
using an image processing technique in association with performing the comparison, wherein the image processing technique includes one or more of:
a feature detection technique,
a blob detection technique,
a histogram matching technique,
a scale-invariant feature transformation technique,
a simultaneous localization mapping technique, or
a homography technique.

5. The method of claim 1, wherein performing the comparison comprises:
performing an image processing technique to compensate for different angles of capture of the first image or the second image.

6. The method of claim 1, wherein determining the amount by which to adjust the field of view comprises:
determining the amount by which to adjust the field of view based on one or more of:
a percentage of the first image and the second image that overlap, or
a quantity of pixels that overlap between the first image and the second image.

7. The method of claim 1, wherein performing the comparison comprises:
identifying a pattern of concentric rings that is indicative of an optical fiber, or
determining whether a set of optical fibers is centered within the field of view with a threshold.

8. A microscope, comprising:
one or more memories; and
one or more processors, coupled to the one or more memories, configured to:
perform a comparison of a first image of interstitial material and a second image of interstitial material captured by a single camera associated with the microscope,
wherein the one or more processors, to perform the comparison are configured to: use the first image and the second image to determine whether the single camera has moved an expected distance;
determine, based on performing the comparison, that an error has occurred with respect to movement of the single camera;
determine, based on determining that the error has occurred, an amount by which to adjust a field of view of the single camera; and
perform, based on determining the amount by which to adjust the field of view, one or more actions associated with the microscope.

9. The microscope of claim 8, wherein the one or more processors, to perform the comparison, are configured to:
identify a match between one or more unique visual patterns of the interstitial material in the first image and the second image, and
determine a same optical fiber is shown in both the first image and the second image.

10. The microscope of claim 8, wherein the one or more processors, to perform the comparison, are configured to:
determine that a first set of optical fibers, shown in the first image, is missing an expected optical fiber, or
determine that a second set of optical fibers, shown in the second image, is missing the expected optical fiber.

11. The microscope of claim 8, wherein performing the comparison comprises:
use an image processing technique in association with performing the comparison, wherein the image processing technique includes one or more of:
a feature detection technique,
a blob detection technique,
a histogram matching technique,
a scale-invariant feature transformation technique,
a simultaneous localization mapping technique, or
a homography technique.

12. The microscope of claim 8, wherein the one or more processors, to perform the comparison, are configured to:
perform an image processing technique to compensate for different angles of capture of the first image or the second image.

13. The microscope of claim 8, wherein the one or more processors, to determine the amount by which to adjust the field of view, are configured to:
determine the amount by which to adjust the field of view based on one or more of:
a percentage of the first image and the second image that overlap, or
a quantity of pixels that overlap between the first image and the second image.

14. The microscope of claim 8, wherein the one or more processors, to perform the comparison, are configured to:
identify a pattern of concentric rings that is indicative of an optical fiber, or
determine whether a set of optical fibers is centered within the field of view with a threshold.

15. A non-transitory computer-readable medium storing a set of instructions, the set of instructions comprising:
one or more instructions that, when executed by one or more processors of a microscope, cause the microscope to:
perform a comparison of a first image of interstitial material and a second image of interstitial material captured by a single camera associated with the microscope,
wherein the one or more processors, to perform the comparison are configured to: use the first image and the second image to determine whether the single camera has moved an expected distance;
determine, based on performing the comparison, that an error has occurred with respect to movement of the single camera;
determine, based on determining that the error has occurred, an amount by which to adjust a field of view of the single camera; and
perform, based on determining the amount by which to adjust the field of view, one or more actions associated with the microscope.

16. The non-transitory computer-readable medium of claim 15, wherein the one or more instructions, that cause the microscope to perform the comparison, cause the microscope to:
determine that a first set of optical fibers, shown in the first image, is missing an expected optical fiber, or
determine that a second set of optical fibers, shown in the second image, is missing the expected optical fiber.

17. The non-transitory computer-readable medium of claim 15, wherein performing the comparison comprises:
use an image processing technique in association with performing the comparison, wherein the image processing technique includes one or more of:
a feature detection technique, a blob detection technique,
a histogram matching technique,
a scale-invariant feature transformation technique,
a simultaneous localization mapping technique, or
a homography technique.

18. The non-transitory computer-readable medium of claim 15, wherein the one or more instructions, that cause the microscope to perform the comparison, cause the microscope to:
perform an image processing technique to compensate for different angles of capture of the first image or the second image.

19. The non-transitory computer-readable medium of claim 15, wherein the one or more instructions, that cause the microscope to determine the amount by which to adjust the field of view, cause the microscope to:
determine the amount by which to adjust the field of view based on one or more of:
a percentage of the first image and the second image that overlap, or
a quantity of pixels that overlap between the first image and the second image.

20. The non-transitory computer-readable medium of claim 15, wherein the one or more instructions, that cause the microscope to perform the comparison, cause the microscope to:
identify a pattern of concentric rings that is indicative of an optical fiber, or
determine whether a set of optical fibers is centered within the field of view with a threshold.

* * * * *